(12) United States Patent
Ali et al.

(10) Patent No.: US 6,828,025 B2
(45) Date of Patent: Dec. 7, 2004

(54) MICROENCAPSULATION OF POLAR LIQUIDS IN COPOLYMER SHELLS

(75) Inventors: Mir Mukkaram Ali, Hamilton (CA); Harald D. H. Stöver, Dundas (CA)

(73) Assignee: McMaster University, Hamilton (CA)

( * ) Notice: Subject to any disclaimer, the term of this patent is extended or adjusted under 35 U.S.C. 154(b) by 0 days.

(21) Appl. No.: 10/445,329

(22) Filed: May 27, 2003

(65) Prior Publication Data

US 2004/0032038 A1 Feb. 19, 2004

Related U.S. Application Data

(60) Provisional application No. 60/382,620, filed on May 24, 2002.

(51) Int. Cl.[7] .......................... B32B 27/00; B01J 13/02
(52) U.S. Cl. .................... 428/402.22; 264/4.1; 264/4.3; 264/4.32; 264/4.33; 264/4.7
(58) Field of Search .................. 264/4.1, 4.3, 4.32, 264/4.33, 4.7; 428/402.22

(56) References Cited

U.S. PATENT DOCUMENTS

| | | | |
|---|---|---|---|
| 4,417,916 A | 11/1983 | Beestman et al. | 71/93 |
| 4,798,691 A | 1/1989 | Kasai et al. | 246/47 |
| 4,908,271 A | 3/1990 | Kasai et al. | 428/402.22 |
| 4,973,670 A | 11/1990 | McDonald et al. | 521/65 |
| 5,573,934 A | 11/1996 | Hubbell et al. | 435/177 |
| 5,596,051 A | 1/1997 | Jahns et al. | 526/73 |
| 6,632,446 B1 | 10/2003 | Bubbell et al. | 424/423 |

FOREIGN PATENT DOCUMENTS

| WO | WO 02/02222 A1 | 1/2002 |
|---|---|---|
| WO | WO 02/41987 A2 | 5/2002 |
| WO | WO 02/100525 A3 | 12/2002 |

OTHER PUBLICATIONS

McDonald, C.J., Bouck, K.J., Chaput, A.B. and Stevens C.J. Emulsion Polymerization of Voided Particles by Encapsulation of a Nonsolvent. *Macromolecules* 2000, 1593–1605.

Okubo, M., Minami, H. Formation mechanism of micron-sized monodispersed polymer particles having a hollow structure. *Colloid Polym Sci.* 1997, 275:992–997.

Okubo, M., Minami, H. Control of hollow size of micron-sized monodispersed polymer particles having a hollow structure. *Colloid Polym Sci.* 1996, 274:433–438.

(List continued on next page.)

*Primary Examiner*—Samuel A. Acquah

(57) ABSTRACT

A process for encapsulation of polar organic solvents with amphiphilic copolymer shell using controlled/living polymerization is provided for the first time. To encapsulate polar core-oils an amphiphilic polymer is required that has low interfacial tensions with both the oil phase and the water phase. For example, Poly(methyl methacrylate-co-poly (ethylene glycol) methacrylate) (PMMA-co-PegMA) was prepared in suspension polymerization conditions using atom transfer radical polymerization (ATRP). ATRP ensures that the water soluble comonomer, PegMA, is incorporated into every polymer chain throughout the polymerization reaction so that all chains possess the desired amphiphilic character. Crosslinking of PMMA-co-PegMA with diethylene glycol dimethacrylate (DegDMA) yielded hollow capsular particles at 31 mol % PegMA in the terpolymer. Particles prepared with similar monomer feed ratios by conventional free radical polymerization did not exhibit a core shell structure confirming the need for controlled/living polymerization to ensure the preparation of an amphiphilic copolymer in suspension polymerization conditions.

17 Claims, 15 Drawing Sheets

OTHER PUBLICATIONS

Okubo, M., Minami, H. and Yamashita, T. Production of micron–sized monodispersed cross–linked polymer particles having hollow structure. *Macromol. Symp.* 1996, 101:509–516.

Matyjaszewski, K., Qui, J., Shipp, D.A., and Gaynor, S.G. Controlled/"Living" Radical Polymerization Applied to Water–Borne Systems. *Macromol. Symp.* 2000, 155: 15–29.

Okubo, M., Shiozaki, M., Tsujihiro, M., Tsukuda, Y. Preparation of micron–size monodisperse polymer particles by seeded polymerization utilizing the dynamic monomer swelling method*) *Colloid & Poly. Sci.* 1991, 269:222–226.

Berg, J., Sundberg, D. and Kronberg, B. Microencapsulation of emulsified oil droplets by *in–situ* vinyl polymerization. *J. Microencapsulation*, 1989, 6(3): 327–337.

Torza, S. and Mason, S.G. Three–Phase Interactions in Shear and Electrical Fields. *J. Coll. Interface Sci.* 1970 33(1): 67–83.

Arshady, R. Preparation of microspheres and microcapsules by interfacial polycondensation techniques. *J. Macroencap.* 1989, 6(1): 13–28.

Patten, T. E., Xia, J., Abernathy, T., Matyjaszewski, K. Polymers with very low polydispersities from atom transfer radical polymerization. *Science* 1996, 272: 866–868.

Sundberg, D.C., Casassa, A. P., Pantazopoulos, J., Muscato, M.R. Morphology development of polymeric microparticles in aqueous dispersions. I. Theremodynamic considerations. *J. Appl. Polymer Sci.* 1990, 41:1425–1442.

Breitenkamp, K., Emrick, T. Novel Polymer Capsules from Amphiphilic Graft Copolymers and Cross–Metathesis. *J. Am. Chem. Soc.* 2003, 125: 12070–12071.

Krafft, M.P., Schieldknecht, L., Marie, P., Giulieri, F., Schmutz, M., Poulain, N., Nakache, E. Fluorinated Vesicles allow intrabilayer polymerization of a hydrophobic monomer, yielding polymerized microcapsules. *Langmuir* 2001, 17: 2872–2877.

van Zyl, A.J.P., Sanderson, R.D., de Wet–Roos, D., Klumperman, B. Core/Shell particles containing liquid cores: morphology prediction, synthesis, and characterization. *Macromolecules* 2003, 36: 8621–8629.

Gaynor, S.G., Qiu, J., Matyjaszewski, K. Controlled/"Living" Radical polymerization applied to water–borne systems. *Macromolecules*. 1998, 31: 5951–5954.

MacLeod, P.J., Veregin, R.P.N., Odell, P.G., Georges, M.K. Stable free radical polymerization of styrene: Controlling the process with Low Levels of Nitroxide. *Macromolecules* 1997, 30: 2207–2208.

Patten, T.E., Matyjaszewski, K. Copper(I)–Catalyzed Atom Transfer Radical Polymerization. *Acc. Chem. Res.* 1999, 32: 895–903.

Okubo, M., Konishi, Y., Minami, H. Production of hollow polymer particles by suspension polymerization. *Colloid Polym. Sci.* 1998, 276:638–642.

Okubo, M., Konishi, Y., Minami, H. Production of hollow polymer particles by suspension polymerizations for divinylbenzene/toluene droplets dissolving various polymers. *Colloid Polym. Sci* 2000, 278:659–664.

Yamada, K., Miyazaki, M., Ohno, K., Fukuda, T., Minoda, M. Atom transfer radical polymerization of poly(vinyl ether) macromonomers. *Macromolecules* 1999, 32: 290–293.

Wang, J–L., Grimaud, T., Matyjaszewski, K. Kinetic study of the homogeneous atom transfer radical polymerization of methyl methacrylate. *Macromolecules* 1997, 30: 6507–6512.

Hawthorne, D.G., Moad, G., Rizzardo, E., Thang, S.H. Living radical polymerization with reversible addition—fragmentation chain transfer (RAFT): Direct ESR observation of intermediate radicals. *Macromolecules* 1999, 32: 5457–5459.

Georges, M.K., Veregin, R.P.N., Kazmaier, P.M., Hamer, G.K. Narrow molecular weight resins by a free–radical polymerization process. *Macromolecules* 1993, 26: 2987–2988.

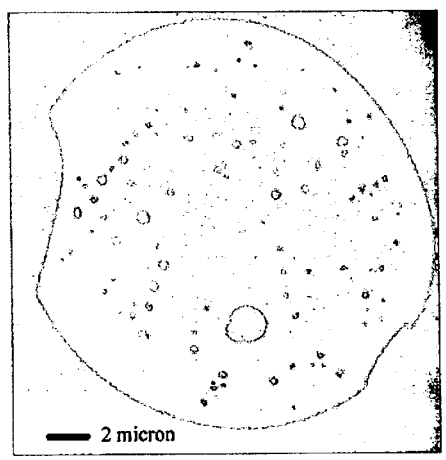 
FIG. 15A  FIG. 15B

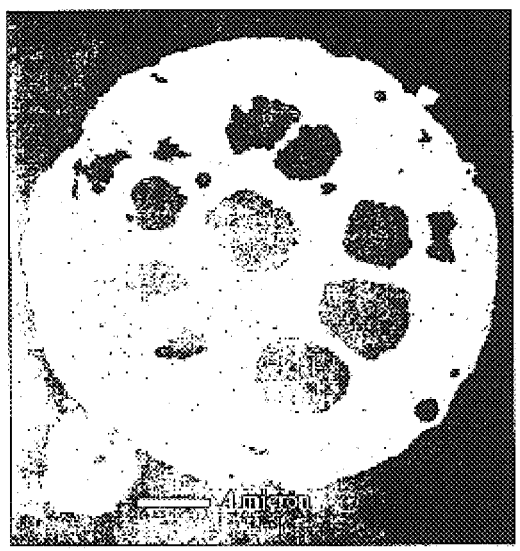 
FIG. 17A  FIG. 17B

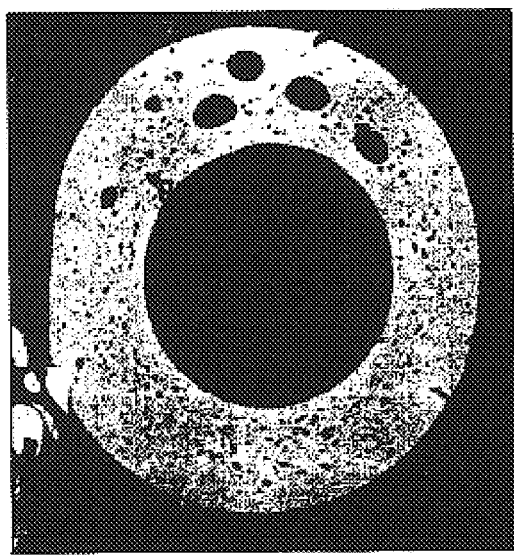 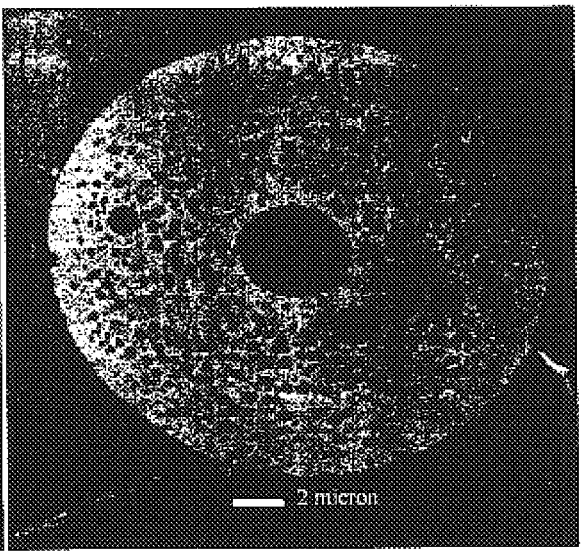
FIG. 18A  FIG. 18B

MICROENCAPSULATION OF POLAR LIQUIDS IN COPOLYMER SHELLS

This application claims the benefit of provisional application 60/382,620 filed on May 24, 2002.

FIELD OF THE INVENTION

This invention provides a process for encapsulating a polar organic solvent which comprises subjecting one or more $C_{1-12}$ alkyl acrylates or $C_{1-12}$ alkyl methacrylates to living polymerization in the presence of the polar solvent.

BACKGROUND OF THE INVENTION

Polymeric capsules and hollow particles can be prepared both from monomeric starting materials as well as from oligomers and pre-formed polymers. (Arshady, R., Microspheres, Microcapsules Liposomes 1999, 1, 1461–1732). In most cases, the process involves a disperse oil phase in an aqueous continuous phase, and the precipitation of polymeric material at the oil-water interface causing each oil droplet to be enclosed within a polymeric shell. Interfacial polycondensation is used to prepare poly(urea) (Beestman, G. B., et. al., U.S. Pat. No. 4,417,916, Nov. 29, 1983), poly(amide), or poly(ester) capsules (Arshady, R. J., Microencapsulation 1989, Vol. 6, No. 1, 13–28), for instance, by reaction between an oil soluble monomer and a water soluble monomer at the oil-water interface. On the other hand, vinyl polymers such as poly(styrene), acrylates and methacrylates prepared by free radical polymerization under suspension (Kasai et. al., U.S. Pat. No. 4,908,271 (Mar. 13, 1990)) or emulsion polymerization (McDonald et. al., U.S. Pat. No. 4,973,670 (Nov. 27, 1990)), (McDonald, C. J. et. al., Macromolecules 2000, 33, 1593–1605) conditions have been used to prepare hollow or capsular polymer particles. In this approach, the dispersed oil phase usually serves as the polymerization solvent. The oil phase is chosen so as to be a good solvent for the monomeric starting materials but a non-solvent for the product polymer. Therefore, upon polymerization the system is comprised of three mutually immiscible phases. Over the past three decades, several groups have studied the factors governing the morphologies that two immiscible phases can adopt when they are brought together in a third immiscible phase by means of a velocity gradient or otherwise. Their findings have led to an understanding of the morphologies that result when, for instance, two immiscible polymers are brought together in a non-solvent for either. This occurs in a seeded emulsion polymerization when the formed polymer and seed polymer are in mutual contact, and are dispersed in an aqueous phase. The same fundamental principles govern the morphology of composite particles that result when a polymer, and a non-solvent organic oil are brought together in an aqueous dispersion, as is the case during the encapsulation of an organic oil.

Torza and Mason (Torza, S. et. al., Journal of Colloid and Interface Science 1970, Vol. 33, No. 1, 67) studied the phase behavior of low viscosity, immiscible organic liquids dispersed in an aqueous phase as the drops were subjected to varying shear and electric fields. They defined the spreading coefficient, $S_i = \gamma_{jk} - (\gamma_{ij} + \gamma_{ik})$, where i, j, and k represent the three immiscible phases and $\gamma$, the interfacial surface tension. For the premise that, $\gamma_{12} > \gamma_{23}$, it follows that $S_1 < 0$. The definition of $S_i$, leads to only three possible sets of values of $S_i$:

$$S_1<0, S_2<0, S_3>0; \quad [1]$$

$$S_1<0, S_2<0, S_3<0; \quad [2]$$

$$S_1<0, S_2>0, S_3>0; \quad [3]$$

It was shown that for interfacial conditions of equation [1] the core-shell morphology is preferred, while for equation [2] the hemispherical morphology is preferred. Good agreement was found between the theoretical predictions and experimental results. It is noteworthy, that Torza and Mason used low viscosity oils that are able to diffuse rapidly and assume the lowest interfacial energy morphology within the time frame of the experiment. Hence, their results may not extend to cases when one or more of the components is a high molecular weight polymer, since diffusional resistance may prevent equilibrium morphology from being realized during the experimental time frame.

Sundberg et. al. (Sundberg, D. C. et. al., Journal of Applied Polymer Science 1990, 41, 1425) published a theoretical model based on the Gibbs free energy change of the process of morphology development. Starting with three immiscible phases; oil, polymer and water, they showed that the Gibbs free energy change per unit area for the process leading to a core shell morphology (with oil encapsulated within the polymer phase), is given by:

$$\Delta G = \gamma_{op} + \gamma_{pw}(1-\phi_p)^{-2/3} - \gamma_{ow} \quad [4]$$

Where $\gamma_{op}$, $\gamma_{pw}$, and $\gamma_{ow}$ are the oil-polymer, polymer-water and oil-water interfacial tensions and $\phi_p$ is the volume fraction of the polymer (in polymer plus oil "combined phase"). In the limit as $\phi_p$ tends to zero, equation [4] reduces to, $$\Delta G = (\gamma_{op} + \gamma_{pw}) - \gamma_{ow} \quad [5]$$

Thus, when $\gamma_{ow} > (\gamma_{op} + \gamma_{pw})$ [6], the core shell morphology with the core oil being engulfed by the polymer is the thermodynamically stable morphology. Analogous expressions were derived for the hemispherical, inverse core shell and distinct particle morphologies. Using these expressions the authors were able to predict the expected morphologies for a given set of interfacial conditions. The predictions were checked and confirmed by experiment.

In an earlier work, Berg et. al. (Berg, J. et. al., Microencapsulation 1989, Vol. 6, No. 3, 327) showed the above analysis is equally valid when the polymer is synthesized in situ by free radical polymerization. Poly(methyl methacrylate) was prepared via free radical polymerization by dispersing n-decane or hexadecane, methyl methacrylate and an oil soluble initiator in water containing a surfactant or stabilizer. It was shown that the resultant morphology was critically dependent on the type of emulsifier used. The authors concluded that this observation appeared to be related to the minimization of interfacial energy for the particles as they are dispersed in water. Thus, the particle morphology that results from in situ polymer synthesis in suspension/emulsion polymerization conditions is predominantly driven by interfacial energy criteria. It must be stated that the above model assumes thermodynamic equilibrium and therefore predicts "final" equilibrium particle morphology. The fact that it correctly predicts the particle morphology when polymer is synthesized in situ implies that phase separation kinetics competes favorably with polymerization kinetics (under the experimental conditions used by Berg et. al.).

The work of the four major research groups in the area, i.e., Kasai et. al., Okubo et. al., McDonald et. al., and Sundberg et. al., shows that present techniques allow only the encapsulation of relatively hydrophobic solvents. McDonald et. al. and Sundberg et. al. have encapsulated highly non-polar core oils such as decane and octane. McDonald et. al. (McDonald, C. J. et. al., *Macromolecules* 2000, 33, 1593–1605), (McDonald et. al., U.S. Pat. No. 4,973,610, Nov. 27, 1990) have also reported the preparation of hollow latex particles by conventional and seeded emulsion polymerization. The conventional emulsion system consisted of an oil phase dispersed in water with the aid of surfactant. The oil phase contained monomer that is essentially non-water soluble and a hydrocarbon oil that dissolves the monomer but is non-solvent for the formed polymer. The aqueous phase consisted of a water soluble initiator and a water miscible alcohol.

The seeded emulsion polymerization differed from the above system in that the seed latex particles were swollen by the oil phase prior to initiation of the polymerization. The encapsulation process occurred in two stages. First, a low molecular weight polymer was made (e.g., 8000 Da using chain transfer agents). The polymer being insoluble in the hydrocarbon solvent begins to phase separate and concentrate at the oil water interface. At this point, a second charge of crosslinker and monomer were added to the system. The additional monomer and crosslinker absorb into the surface polymer phase on the oil droplets. Oligomers from initiation in the water phase also anchor onto this surface polymer phase. Thus, the surface polymer layer (on the oil droplets) now serves as the locus of further polymerization and the crosslinked network that stabilizes the surface polymer layer yielding the hollow particle morphology.

The addition of water miscible alcohol to the water phase was shown to be critical for efficient encapsulation; in the absence of alcohol, latex particles with a layer of hydrocarbon on the surface were obtained. In a model experiment, increasing the amount of alcohol lowered the interfacial surface tension between an alcoholic aqueous phase and an 80/20 mixture of poly(styrene) and ethylbenzene, thereby partially explaining the enhanced encapsulation efficiency in the presence of alcohol.

Kasai et. al. and Okubo et. al. have encapsulated slightly more polar materials such as benzene, toluene and xylene. Kasai et al., (Kasai et al., U.S. Pat. No. 4,908,271 (Mar. 13,1990)), (Kasai et al., U.S. Pat. No. 4,798,691 (Jan. 17, 1989)) have described the production of hollow polymer particles by both classical suspension and emulsion polymerizations, and seeded suspension polymerization. In the classical suspension polymerization method, the oil phase consisted of an inert solvent, a hydrophobic and a hydrophilic monomer, a crosslinking monomer and an oil soluble free radical initiator. The suspension was stabilized with organic or inorganic stabilizers. This method yielded hollow polymer particles with a mean size distribution of about 10 microns and a total monomer conversion of 98%. It was shown that exclusion of the hydrophilic monomer from the system yielded porous polymer particles rather than hollow particles. Also, exclusion of the crosslinking monomer led to solid particles with no core-shell structure. Therefore, to obtain the capsular morphology it is necessary that the formed polymer has both hydrophobic and hydrophilic content and be crosslinked.

A plausible mechanism supported by their results is as follows. Upon thermal initiation the suspension polymerization yields terpolymers comprised of the hydrophobic, hydrophilic and crosslinking monomers. Since, the hydrophilic monomer partitions into the water phase in suspension polymerization conditions, the early part of the suspension polymerization would essentially produce copolymer that is rich in the hydrophobic monomer and the crosslinking monomer (divinyl benzene (DVB), also hydrophobic). On the other hand, the latter part of the polymerization would yield terpolymers rich in the hydrophilic monomer. Since the reactivity of the second vinyl group on DVB is lower than that of the first, it is postulated that the copolymers formed during the early part of the suspension polymerization will possess unreacted vinyl groups that will remain available for polymerization until the latter part of the suspension polymerization. Hence, the terpolymers polymers formed in the early and late periods of the suspension polymerization will be covalently bonded to yield amphiphilic gels. These amphiphilic gels would migrate to the oil water interface and precipitate as the crosslinking reaction proceeds, thereby yielding the core-shell morphology.

This hypothetical mechanism partly explains why the presence of crosslinker is critical to obtaining the core-shell morphology. Or another plausible reason is based on the fact that, in general, polymer precipitation at an interface is associated with an entropic penalty. This is so because of the reduced degrees of freedom available to polymer at an interface as opposed to polymer in the bulk phase. This entropic penalty is less significant for crosslinked polymer than it is for linear polymer because the former has fewer degrees of freedom to start with. Therefore, crosslinked polymer is more likely to precipitate at an interface than is linear polymer (other parameters being identical).

In summary, the entropic advantage of crosslinked polymer for precipitation at an interface as well as the formation of amphiphilic gels in the presence of crosslinker may explain the fact that core-shell particles are obtained only when the forming polymer is crosslinked.

Particles of sub-micron diameter were achieved using the emulsion polymerization method. Here, water soluble initiator and a surfactant were employed with the remainder of the system being essentially the same as described above. Like the suspension system, the presence of both hydrophilic and crosslinking monomer was critical to obtaining hollow particles.

Seeded suspension polymerization involved the use of fine non-crosslinked latex particles prepared via emulsion polymerization in a previous step. It was essential that low molecular weight polymer (7000–10,000 Da) be used to ensure efficient swelling of the seed particles. The size and polydispersity of the final hollow polymer particles were controlled via the seed particles. Using this method sub-micron to 10 micron monodisperse particles were prepared. These hollow particles were monodisperse in comparison to those prepared via suspension polymerization.

In both the emulsion and seeded suspension polymerization methods, the presence of both hydrophilic and crosslinking monomer was critical to obtaining hollow particles.

The compositions used in the examples were based on:

Styrene, n-butyl acrylate or butadiene as hydrophobic monomer;

4-vinyl pyridine, methyl methacrylate, methacrylic acid or hydroxyethyl methacrylate as hydrophilic monomer;

Divinyl benzene as crosslinking monomer: and

Toluene or benzene as oil phase.

Okubo et. al. (Okubo, M. et. al., *Macromol. Symp.* 1996, 101, 509–516) prepared core-shell poly(divinylbenzene) (PDVB) particles (~10 µm diameter) containing toluene in the core and PDVB in the shell by seeded suspension polymerization. Polystyrene seeds (~3 µm diameter) were swollen with DVB and toluene using the "Dynamic Swelling Method" (DSM) that Okubo developed earlier (Okubo, M. et. al., *Colloid Polym. Sci.* 1991, 269, 222–226) for the preparation of monodisperse homogeneous PDVB particles. In DSM, seed latex particles are dispersed in a solution of toluene, DVB, radical initiator (such as benzoyl peroxide) and stabilizer in an ethanol/water mixture. Slow addition of more water to this mixture drives toluene, DVB and the radical initiator into the seed particles since the water/ethanol binary solvent becomes increasingly polar and therefore immiscible with these organic compounds. In contrast with the conventional swelling method, this represents an additional force that drives solvent, monomer and initiator into the seed particles. In the conventional swelling method, the seed particles, solvent, monomer and initiator are soluble in the alcohol/water mixture that serves as the polymerization medium. Hence, the only driving force for the solvent, monomer and initiator to partition into the seed particles is the gain in entropy resulting from mixing of these compounds with the seed polymer. There is therefore an upper limit to the amount of solvent, monomer and initiator that will swell the seeds since the gain in entropy associated with the mixing process becomes insignificant after some finite degree of swelling. Consequently, using the conventional swelling method, ~2 μm seed particles can be swollen to ~5 μm diameter. Using DSM, on the other hand, ~2 μm seed particles can give up to ~10 μm swollen particles. Following the swelling process using DSM, thermal polymerization of the DVB monomer yields core shell particles with toluene in the core and a PDVB shell.

Okubo et. al. (Okubo, M. et. al., *Colloid Polym. Sci.* 1997, 275, 992–997) have shown that polymerization of styrene under the same seeded polymerization conditions does not yield hollow particles, i.e., only when the formed polymer is crosslinked does it precipitate at the interface with water yielding the core-shell morphology. By observing the evolution of the particle morphology during the course of the suspension polymerization, they proposed a mechanism for the formation of the hollow particles: the formed PDVB precipitates in the swollen seed particles and is trapped near the interface based on surface coagulation and gradually piles up at the inner surface, resulting in a cross-linked PDVB shell.

Okubo et. al. (Okubo, M. et. al., *Colloid Polym. Sci.* 1998, 276, 638–642) have also shown that a minimum amount of seed polymer of a minimum molecular weight is necessary for the formation of the core-shell structure. The core volume is controllable via the amount and nature of the core solvent (Okubo, M. et. al., *Colloid Polym. Sci.* 1996, 274, 433–438). Increasing the amount of core solvent for a given amount of seed particles increased the core size. Also, using core solvents that differ in their water solubility, it was shown that solvents with higher water solubility gave smaller particles with smaller core volume due to loss of core solvent to the alcohol/water polymerization medium. Okubo et. al. (Okubo, M. et. al., *Colloid Polym. Sci.* 2000, 278, 659–664) conducted suspension polymerizations of DVB in xylene/toluene solutions of polymers differing in their polarity (as reflected by the solubility parameter) (Table 1), and monitored particle morphology. The polymer solutions in these experiments represented seed polymer of seeded suspension polymerizations. The interfacial tension between water and the polymer solutions determined the observed particle morphology.

TABLE 1

Solubility parameters and Interfacial surface tensions with water of some polymer solutions.

| Seed polymer | Solubility parameter/ $MPa^{1/2}$ | Interfacial tension $(mN/m)^a$ |
|---|---|---|
| Poly(styrene) | 18.7 | 35.0 |
| Poly(n-butyl methacrylate) | 17.8 | 31.7 |
| Poly(n-butyl acrylate) | 17.4 | 29.8 |
| Poly(ethyl methacrylate) | 18.2 | 25.5 |
| Poly(ethyl acrylate) | 19.8 | 22.4 |
| Poly(methyl methacrylate) | 19.3 | 18.4 |
| Poly(methyl acrylate) | 20.1 | 12.9 |

$^a$Interfacial tension (measured by the Du Noüy ring method at 23 ± 3° C.) between water and Xylene/toluene (1:1, w/w) solutions of various homopolymers (0.01 wt %).

The interfacial tension between water and xylene/toluene (1/1, w/w) is 34.8 mN/m and that between water and a 0.01 wt % PDVB solution in xylene/toluene (1/1, w/w) is 29.5 mN/m. It was observed that when the interfacial tension between water and the seed polymer solution was below 20 mN/m, no hollow particles formed. For interfacial tension between 20–30 mN/m, hollow particles with a rough inner (shell) surface and an unclear shell structure were observed. Clear hollow particles were observed only when the interfacial tensions were above 30 mN/m. Thus, hollow particles formed only when the PDVB interfacial surface tension with water is below that of the core polymer solution.

Since these groups set out to synthesize hollow polymer particles, the nature of the core oil has not been relevant. However, if core-shell particles are intended for encapsulation of the core material, then it becomes desirable that the technique allows encapsulation of both hydrophobic and hydrophilic core materials.

Core-shell particles, with polymer engulfing an oil core, only form if the sum of the oil/polymer and polymer/water interfacial tensions is less than the oil/water interfacial tension. Consequently, encapsulation of more hydrophilic material demands the ability to synthesize sufficiently amphiphilic polymers that will satisfy this interfacial requirement. Copolymers comprised of an oil-soluble and a water-soluble monomer are amphiphilic materials whose polarity characteristics can be conveniently controlled by varying the comonomer ratios. However, the synthesis of these materials in suspension polymerization conditions is significant since the water-soluble monomer partitions into the aqueous phase and is only partially incorporated into polymer forming in the oil phase if conventional free radical polymerization is used as the means of polymer synthesis. Thus, current techniques that use conventional free radical polymerization as the means of polymer synthesis do not permit the in situ synthesis of such amphiphilic polymers in suspension or emulsion polymerization conditions. Applicants propose that the use of a living polymerization method as the means of polymer synthesis will allow the preparation of amphiphilic copolymers by suspension polymerization and henceforth, meet the interfacial requirement for encapsulating more hydrophilic core oils.

SUMMARY OF THE INVENTION

According to one aspect of the present invention, there is provided a process for encapsulating a polar organic solvent which comprises subjecting one or more $C_{1-12}$ alkyl acrylates or $C_{1-12}$ alkyl methacrylates to living polymerization in the presence of the polar solvent.

According to another aspect of the present invention, there is provided a process for encapsulating a polar organic solvent comprising: synthesis of an amphiphilic co-polymer by controlled/living polymerization in a polar solvent; carrying out the synthesis until a predetermined degree of conversion or length of the co-polymer chain is obtained; addition of a crosslinking monomer to form a reaction mixture; and subjecting the reaction mixture to mixing to yield microcapsules containing the polar solvent.

According to still another aspect of the present invention, there is provided a microcapsule comprising a polar solvent encapsulated by an amphiphilic co-polymer shell.

The process described herein relies on the use of controlled/living polymerization to incorporate substantially all monomer into the capsule wall. The encapsulation system of the present invention depends upon forming a crosslinked polymer that has a surface energy, or polarity, higher than that of the organic phase, but lower than that of the aqueous phase. In this way, the polymer capsule wall forms at the location of lowest energy, i.e. at the interface between the organic and the aqueous phase. In the heterogeneous polymerization system described herein, a significant part of the hydrophilic monomer partitions into the aqueous phase. As the polymer wall forms on the organic side of the interface, the organic phase becomes depleted of this hydrophilic monomer. Living polymerizations allow the individual polymer chains to remain active long enough to permit the portion of the hydrophilic monomer present in the aqueous phase, to partition back into the organic phase, thereby becoming incorporated into the forming polymer.

Living/controlled polymerizations are characterized by maintaining their active polymer chain ends for an extended period of time, sufficient to convert substantially all available monomer into polymer. The presence of an aqueous phase in the polymerization systems as described herein precludes the use of living anionic and living cationic polymerizations, as their reactive polymer chain ends, a carbanion or carbocation, respectively, would be instantly quenched by the water. There are three major living radical polymerizations presently known, called Atom Transfer Radical Polymerization (ATRP), Stable Free Radical Polymerization (SFRP), also called Nitroxide-Mediated Polymerization (NMP), and Reversible Addition-Fragmentation chain Transfer Polymerization (RAFT Polymerization). While the examples focus on using ATRP, the present invention may be practiced using other controlled/living radical polymerizations, such as SFRP and RAFT.

SFRP, or more generally nitroxide-mediated polymerization, involves the reversible protection and deprotection of the active chain end by a stable free radical called nitroxide. SFRP was developed by Michael Georges (Georges, M. K.; Veregin, R. P. N.; Kazmaier, P. M.; Hamer, G. K., *Macromolecules*, 1993, 26, 2987–2988. MacLeod, P. J.; Veregin, R. P. N.; Odell, P. G.; Georges, M. K. ibid. 1997, 30, 2207–2208), and has also been shown to perform in aqueous environments.

RAFT Polymerization, developed by a team led by E. Rizzardo (D. G. Hawthorne, G. Moad, E. Rizzardo, S. H. Thang, Macromolecules, 1999, 32, 5457–5459), has been shown to work well in aqueous environments such as emulsion polymerization as described by S. W. Prescott, M. J. Ballard, R. Rizzardo, R. G. Gilbert, Australian J. Chemistry, 2002, 55, 415. It involves a thio-ester catalyst species that is transferred between active chain ends, and facilitates their slow, controlled growth.

Atom transfer radical polymerization is a controlled/"living" polymerization based on the use of radical polymerization to convert monomer to polymer. Although many polymers have been prepared using other types of living polymerizations, researchers have been striving to develop a living radical polymerization for nearly 40 years. An alternative was sought because other types of living polymerizations are severely limited by many factors: only a small number of monomers can be used, the reactions are sensitive to moisture, and two or more monomers cannot be randomly copolymerized. Radical polymerization, in contrast, can polymerize hundreds of monomers, can copolymerize two or more monomers, and can be performed in water as emulsions or suspensions. Controlled/"living" radical polymerization promised to overcome these limitations and provide a method to maximize the potential of living polymerizations.

The Matyjaszewski research group was the first to develop a controlled/"living" polymerization that used a simple, inexpensive polymerization system. It is capable of polymerizing a wide variety of monomers, is tolerant of trace impurities (water, oxygen, inhibitor), and is readily applicable to industrial processes. The system that was developed was termed atom transfer radical polymerization (ATRP). ATRP is a robust system that has generated much interest among polymer chemists in both industry and academia.

The control of the polymerization afforded by ATRP is a result of the formation of radicals that can grow, but are reversibly deactivated to form dormant species. Reactivation of the dormant species allows for the polymer chains to grow again, only to be deactivated later. Such a process results in a polymer chain that slowly, but steadily, grows and has a well-defined end group. For ATRP, that end group is usually an alkyl halide.

The initiator is generally a simple, commercially available, alkyl halide. The catalyst is a transition metal that is complexed by one or more ligands; the catalyst does not need to be used in a one-to-one ratio with the initiator but can be used in much smaller amounts. The deactivator can be formed in situ, or for better control, a small amount (relative to the catalyst) can be added. Additionally, the catalyst is tolerant of water and trace amounts of oxygen.

Although other controlled radical polymerization systems have been reported by various groups, ATRP remains the most powerful, versatile, simple, and inexpensive. ATRP has been able to polymerize a wide range of monomers including various styrenes, acrylates and methacrylates as well as other monomers such as acrylonitrile, vinyl pyridine, and dienes. ATRP commonly uses simple alkyl halides as initiators and simple transition metals (iron, copper) as the catalysts. These catalysts can be used in very low amounts, whereas, other controlled polymerization systems require the use of expensive reagents in much higher concentrations.

As described herein, the in situ synthesis of an amphiphilic co-polymer has been designed to migrate to the oil-water interface and thereto crosslink and precipitate. The amphiphilic copolymer, poly(methyl methacrylate-co-poly (ethylene glycol monomethyl ether) methacrylate)), was prepared by atom transfer radical polymerization (ATRP) in suspension polymerization conditions. ATRP, being a living radical polymerization (Patten, T. E. et. al., Acc. Chem. Res. 1999, 32, 895–903), (Patten, T. E. et. al., Science 1996, 272, 866–868), ensures that all polymer chains remain active and that the water-soluble co-monomer (poly(ethylene glycol methacrylate)) is incorporated continuously into each polymer chain throughout the suspension polymerization. This is essential to impart the desired amphiphilic nature to the copolymer. ATRP is tolerant to water or other protic solvents and impurities unlike ionic living polymerization methods and proceeds efficiently at temperatures below the boiling point of water making it the method of choice for aqueous suspension polymerizations (Matyjaszewski, K. et. al., Macromol. Symp. 2000, 155, 15–29). In addition, this work opens the possibility of building capsular walls from block and terpolymers in future.

The invention may be used to encapsulate very polar materials such as pharmaceutically active materials, dissolved in a polar solvent such as glyceryl triacetate that is suspended in a hydrophobic continuous phase, wherein the continuous phase could be a linear or cycloaliphatic or aromatic solvent ranging from C5 through C20.

This would permit use of many biocompatible monomers such as hydroxyethylmethacrylate and methacrylamide as wall forming monomers at room temperature, using the very active linear amines based on oligomers of ethyleneimines, ranging from 2 through 50 repeat units of ethylene imine.

Other suitable solvents include diphenyl ether, alkyl acetates, alkyl propionates, alkyl butanoates, alkyl adipates, alkyl benzoates, and alkyl phthalates, in each case with alkyl chains ranging from C1 through C12, aliphatic alcohols ranging from C4 through C12, dialkyl ketones with the sum of both alkyl groups ranging from C4 through C20, and dialkyl ethers with the sum of both alkyl groups ranging from C4 through C20. Additionally, industrially used plasticizers such as acetyl trialkyl citrate, with alkyl chains ranging from C2 through C6 can be used.

In addition to the monomers exemplified and described herein, the novel process of the present invention may be employed using other monomers and reagents as follows:

Hydrophilic Monomers:
Methacrylates: polyethyleneglycol methacrylate (PEGMA), with the number of ethylene glycol units ranging from 1 to 22, and dimethylaminoethylmethacrylate (DMAEMA); as well as the analogous acrylates;
Styrenics: polyethyleneglycol modified styrene, with the number of ethyleneglycol units in the PEO chain ranging from 1 through 20;
Acrylamides: alkyl acrylamides and alkylmethacrylamides, where the alkyl group could have from 1 through 3 carbon atoms, including such acrylamides as N-isopropylacrylamide and N,N-dimethylacrylamide; and
Vinyl ethers: methyl vinyl ether, ethylvinyl ether, polyethyleneglycol vinyl ether (PEGVE), with between 1 and 20, preferably between 1 and 5 ethylene glycol units in the PEG chain.

Hydrophobic Monomers:
Methacrylates: alkyl methacrylates (C1–C12, preferably 1–4 carbons in the alkyl group);
Acrylates: Alkyl acrylates (C1–C12, preferably 1–4 carbons in the alkyl group); and
Styrenics: styrene, optionally carrying one or more substituents such as methyl, ethyl or higher alkyl groups.

Crosslinking Monomers:
Oligoethyleneglycol dimethacrylate, containing between 1 and 10 ethyleneglycol units between the two methacrylate groups, preferable between and 4, most preferably either 1 (EGDMA) or 2 (DEGDMA);
Oligoethyleneglycol diacrylates, containing between 1 and 10 ethyleneglycol units between the two acrylate groups, preferable between and 4, most preferably either 1 (EGDA) or 2 (DEGDA);
Bis-acrylamides, containing either a methylene spacer or an ethylene spacer between the two acrylamide units; and
Divinylbenzene (DVB).

Catalysts:
Bipyridines: alkyl modified, where alkyl is a linear or branched aliphatic group having between 3 and 18 carbons, preferably between 6 and 10 carbons;
Alkyl-2-pyridylmethanimines, where the alkyl group could be a linear or branched chain having between 1 and 10 carbons;
Aryl-2-pyridylmethanimines, where the aryl group could be benzene or a substituted benzene group; and
Other catalysts may be chosed from the classes of 1,10-phenantrolines and Picolyl alkyl amines.

Initiators:
Sulfonyl halides, such as tosyl chloride;
Conventional ATRP initiators such as alkyl-2-halo isobutyrate and alkyl-2-halo propionate, where alkyl is a linear or branched alkyl group having between 1 and 10 carbons, preferably between 2 and 4 carbons; and
Benzyl halides such as 1-phenyl-alkyl halide, where alkyl is a linear or branched alkyl group having between 1 and 10 carbons, preferably between 2 and 6 carbons, and where halo stands for either chlorine or bromine.

One aspect of the invention is that the copolymerization of the alkylmethacrylate or acrylate and the polyalkyleneglycol methacrylate or acrylate, can be carried out initially in a homogeneous solution and to different degrees of conversion or chain length. Subsequently, as crosslinking monomers are added and the reaction mixtures transferred into the suspension polymerization reactor, different morphologies are observed. For example, reaction mixtures transferred at high conversion will result in a more capsular morphology, with dense walls, while reaction mixtures transferred at lower conversion in the initial copolymerization will result in final particles showing more homogeneous distribution of polymer throughout the capsule, as in a matrix particle.

In other words, living/controlled polymerization provides the ability to control the polymer solubility in a given core solvent, by controlling the degree of conversion, and hence the length of the living copolymer chains, at which the crosslinker is added and the polymerization mixture is transferred into the suspension reactor. Thus for a given ratio of the comonomers, applicants are able to modify the morphology via the polymer architecture ie., molecular weight of linear polymer chains on the crosslinked polymer. This morphology in turn can control the release behavior of the active materials inside the capsules.

BRIEF DESCRIPTION OF THE DRAWINGS

In the following description, the invention will be explained in detail with the aid of the accompanying drawings which illustrate preferred embodiments of the present invention:

FIG. 15(A) is a TEM micrograph showing internal morphology of PegMA-8 particles at 83% conversion to polymer and FIG. 15(B) is a TEM micrograph showing internal morphology of PegMA-8 particles at 98% conversion to polymer.

FIG. 17(A) is a TEM micrograph showing internal morphology of PegMA-30 particles at 92% conversion to polymer and FIG. 17(B) is a TEM micrograph showing internal morphology of PegMA-30 particles at 98% conversion to polymer.

FIGS. 18(A) and 18(B) are TEM micrographs showing internal morphologies of a minority of the PegMA-30 particles at 98% conversion to polymer.

DETAILED DESCRIPTION OF THE INVENTION

Copolymer Synthesis in Diphenyl Ether.

The ATRP synthesis of poly(methyl methacrylate-co-poly(ethylene glycol monomethyl ether) methacrylate)) (PMMA-co-PegMA) was first developed in solution polymerization conditions. A series of copolymers comprised of methyl methacrylate (MMA) and 9.5, 18, 39, and 60 mol % poly(ethylene glycol monomethyl ether) methacrylate (PegMA) were prepared by both solution and suspension polymerization. Diphenyl ether (DPE) was used as solvent since it is a relatively polar solvent as reflected by its solubility parameter (Table 2). Furthermore, it is a good ATRP solvent owing to its low chain transfer constant and its use for the ATRP of methacrylate monomers has been reported (Wang, J. et. al., Macromolecules 1997, 30, 6507–6512). Toluene sulfonyl chloride (TSC) was used as initiator and a catalyst based on Cu(I)Br and 4,4'-dinonyl-2,2'-bipyridine (dNBpy) was used as ATRP catalyst. Advantageously, the modified bipyridine ligand ensures homogeneous catalyst solubility in diphenyl ether as well as favorable partitioning of the catalyst into the oil phase during suspension polymerizations (Gaynor, S. G. et. al., Macromolecules 1998, 31, 5951–5954). Both the solution polymerizations and the suspension polymerizations were run at 70° C. The goal was to develop the ATRP synthesis of PMMA-co-PegMA for use in the encapsulation reaction and thus preparation of the copolymer at low monomer loadings (10–50% w/w) was desirable. The range of interest from the encapsulation view point is between 10 and 25 weight percent as this amount of polymer is sufficient for constructing the capsular wall. For development of the ATRP reaction applicants chose a monomer feed composition of 82 mol % MMA and 18 mol % PegMA.

TABLE 2

Solubility characteristics of some organic solvents

| Entry No. | Solvent | Solubility parameter/ $MPa^{1/2}$ | Solubility of solvent in water/% v/v | Solubility of water in solvent/% v/v |
| --- | --- | --- | --- | --- |
| 1 | Ethyl acetate | 18.2/18.6 | 9 (25° C.) | 4 (25° C.) |
| 2 | n-butyl acetate | 17/17.4 | 0.78 (25° C.) | 2.9 (25° C.) |
| 3 | Hexyl acetate | 17.3 | Insoluble | Insoluble |
| 4 | Xylene | 18.0 | Insoluble | Insoluble |
| 5 | Anisole | 19.4 | Insoluble | Insoluble |
| 6 | Diphenyl ether | 20.9 | Insoluble | Insoluble |
| 7 | Dimethyl phthalate | 22.1/21.9 | Insoluble | Insoluble |

Other water immiscible solvents besides diphenyl ether may include alkyl acetates, alkyl propionates, alkyl butanoates, alkyl adipates, alkyl benzoates, and alkyl phthalates, in each case with alkyl chains ranging from C1 through C12. Aliphatic alcohols ranging from C4 through C12, dialkyl ketones with the sum of both alkyl groups ranging from C4 through C20, and dialkyl ethers with the sum of both alkyl groups ranging from C4 through C20 are also suitable solvents. Additionally, industrially used plasticizers such as acetyl trialkyl citrate, with alkyl chains ranging from C2 through C6 can be used.

Figure 1:
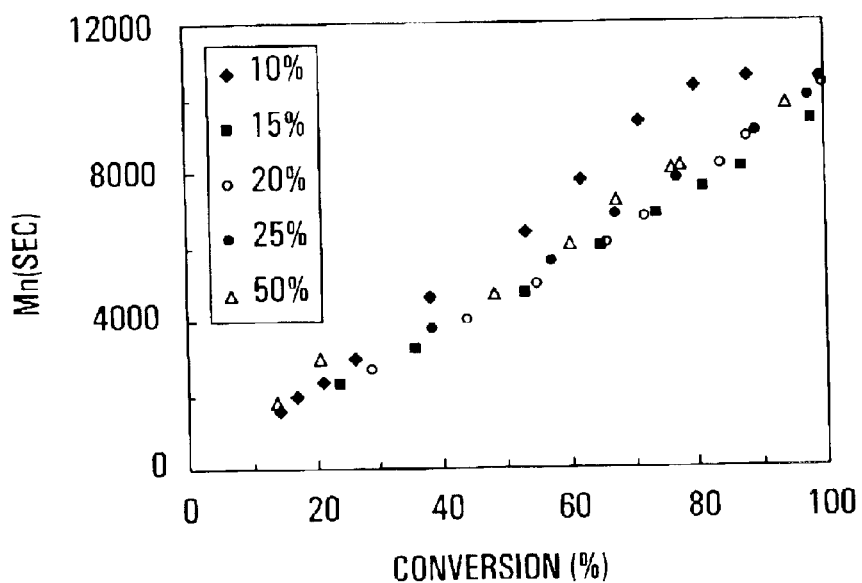
FIG. 1 is a graphic illustration of experimental molecular weight ($M_n$(SEC)) vs conversion for polymerization of PMMA-co-PegMA in DPE at 10–50 wt %. $[MMA]_0$:$[PegMA]_0$:$[TSC]_0$:$[Cu(dNBpy)_2Br]_0$=30:7:1:1 at 70° C.
Figure 2:
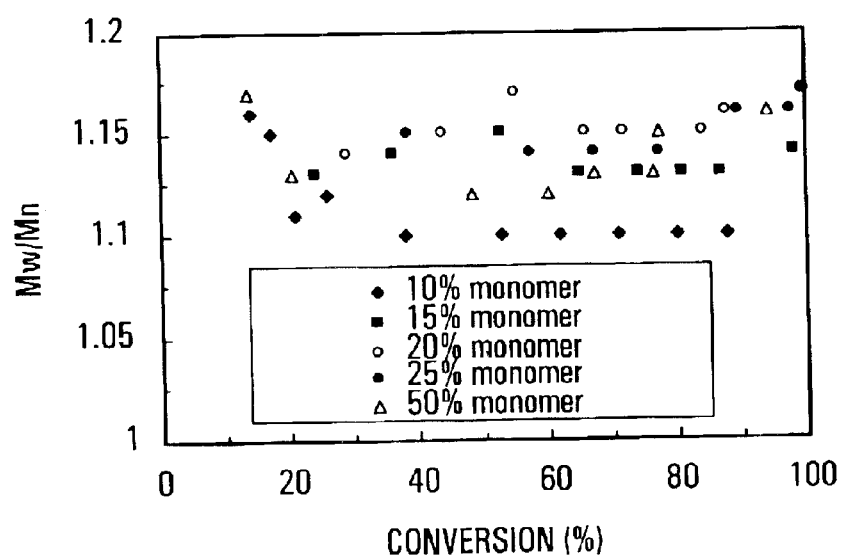
FIG. 2 is a graphic illustration of Polydispersity Index (Mw/Mn) vs conversion for polymerization of PMMA-co-PegMA in DPE at 10–50 wt %. $[MMA]_0$:$[PegMA]_0$:$[TSC]_0$:$[Cu(dNBpy)_2Br]_0$=30:7:1:1 at 70° C.
Figure 3:
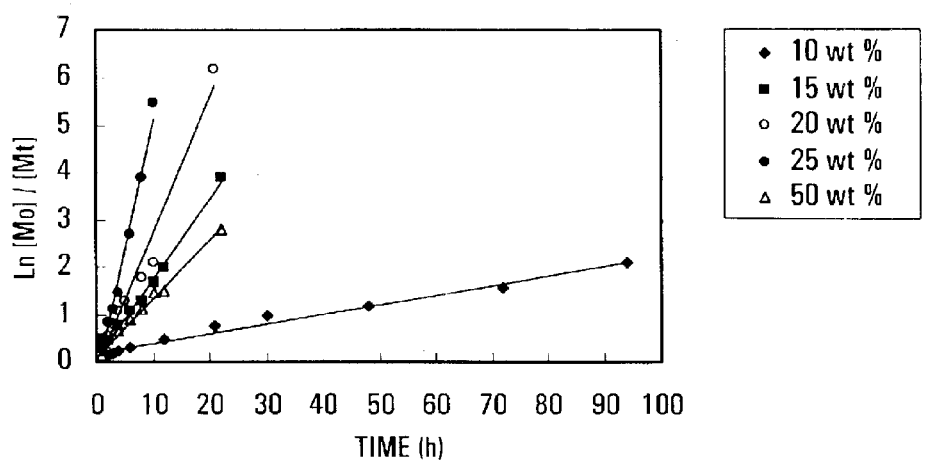
FIG. 3 is a graphic illustration of kinetic profiles for polymerization of PMMA-co-PegMA in DPE at 10–50 wt %. $[MMA]_0$:$[PegMA]_0$:$[TSC]_0$:$[Cu(dNBpy)_2Br]_0$=30:7:1:1 at 70° C.

As seen in Table 3, all ATRP reactions exhibited final polydispersity of 1.1–1.2 as well as good agreement between the theoretical and experimental number average molecular weights ($M_n$). The experimental molecular weight ($M_n$ (SEC)), increased linearly with conversion, while the polydispersities showed a slight increase with conversion (FIGS. 1 and 2). FIG. 3 indicates that the reaction rate was first order in monomer concentration indicating that the free radical concentration remained constant throughout the reaction period for all cases.

TABLE 3

Synthesis of Poly(MMA-co-PegMA)-18 mol % PEgMA- in Diphenyl ether at low monomer loading. $[MMA]_o:[PegMA]_o:$ $[TSC]_o:[Cu(dNBpy)_2Br]_o = 30:7:1:1, 70°$ C.

| Monomer Concentration (% w/w) | Conversion (%) | Time (h) | $M_n$ (SEC) | $M_n$ (Theo) | $M_w/M_n$ |
|---|---|---|---|---|---|
| 10 | 88 | 94 | 10530 | 8991 | 1.10 |
| 15 | 87 | 12 | 8068 | 8891 | 1.13 |
| 20 | 88 | 10 | 8901 | 8991 | 1.16 |
| 25 | 100 | 10 | 10460 | 10151 | 1.17 |
| 50 | 94 | 22 | 9781 | 9410 | 1.16 |

Furthermore, it is noteworthy that the reaction rate increases from 10 through 25% monomer loading and drops again at 50% loading. From the ATRP rate equation, $$R_p = k_p(k_a/k_d)[M][Cu(I)]/[Cu(II)X]$$

it is evident that the rate of polymerization, $R_p$, depends on the propagation rate constant, $k_p$, the activation/deactivation constants of the propagating radical, $k_a/k_d$, as well as the monomer concentration, $[M]$, and the relative concentrations of the Cu(I) and Cu(II) species, $[Cu(I)]/[Cu(II)X]$. Explanation of the observed rate dependence on monomer loading apparently lies in the manner in which $k_p$, $k_a/k_d$, and $[Cu(I)]/[Cu(II)X]$ respond to monomer loading. No further experiments were performed to determine how these parameter(s) vary with monomer loading.

Figure 4:
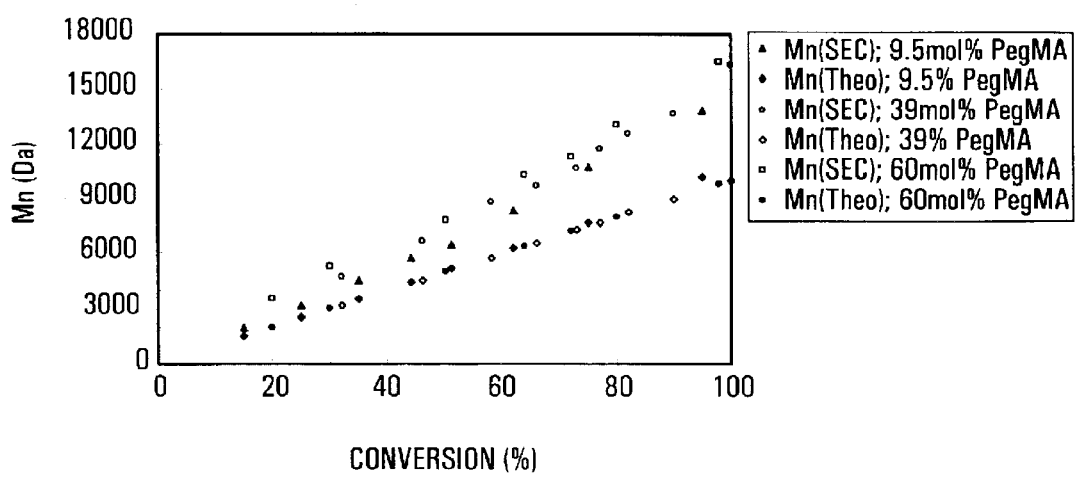
FIG. 4 is a graphic illustration of plots of experimental ($M_n$(SEC)) and theoretical ($M_n$(Theo)) molecular weight vs conversion for polymerization of PMMA-co-PegMA (% PegMA=9.5, 39, and 50) in DPE at 25 wt %. [TSC]$_0$:[Cu(dNBpy)$_2$Br]$_0$=1:1 at 70° C.
Figure 5:
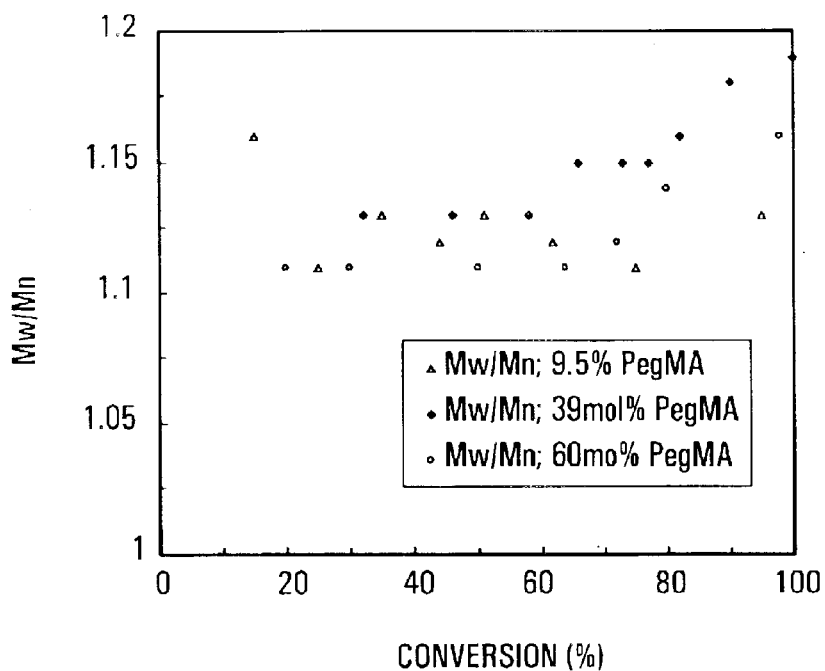
FIG. 5 is a graphic illustration of polydispersity vs conversion for polymerization of PMMA-co-PegMA (% PegMA=9.5, 39, and 50) in DPE at 25 wt %. [TSC]$_0$:[Cu(dNBpy)$_2$Br]$_0$=1:1 at 70° C.
Figure 6:
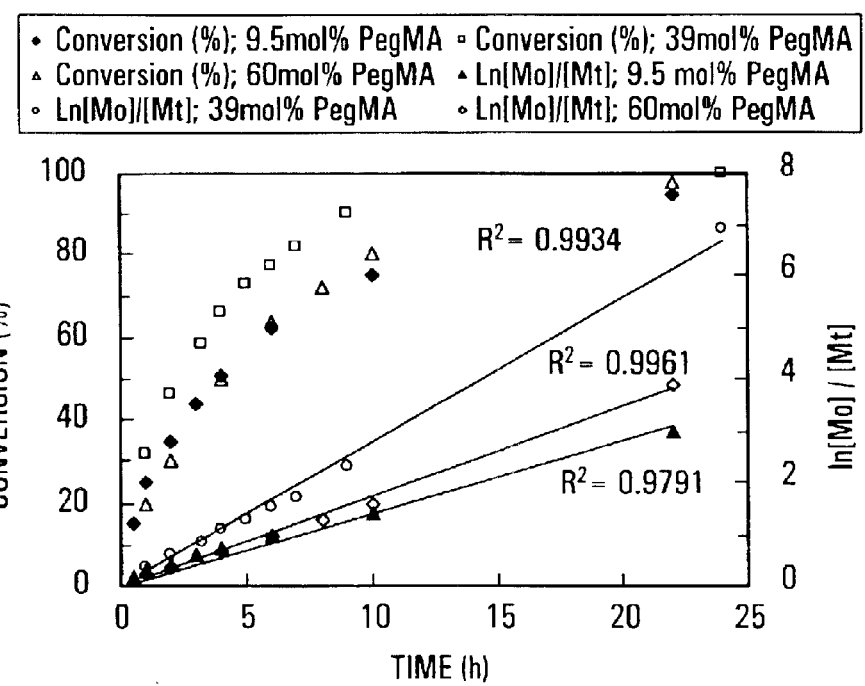
FIG. 6 is a graphic illustration of the kinetics of polymerization of PMMA-co-PegMA (% PegMA=9.5, 39, and 50) in DPE at 25 wt %. [TSC]$_0$:[Cu(dNBpy)$_2$Br]$_0$=1:1 at 70° C.

Results of the ATRP synthesis of the copolymers containing 9.5, 39, and 60 mol % PegMA are shown in FIGS. 4, 5 and 6. Polymerizations proceeded to high conversions in each case and polydispersity remained low confirming the living character of the polymerization. Applicants attribute the difference between the experimental molecular weight ($M_n$(SEC)) and the theoretical molecular weight ($M_n$(Theo)) to structural differences between the GPC calibration standard i.e. poly(styrene), and the copolymer. Apparently, the over estimation of molecular weight increases with the amount of PegMA in the copolymer as can be seen in FIG. 4.

Copolymer Synthesis in Suspension Conditions.

Next, the ATRP synthesis of PMMA-co-PegMA was performed, in part, in suspension conditions. The purpose of this experiment was two fold. First, to show that PMMA-co-PegMA can be prepared by ATRP in suspension polymerization conditions. Secondly, to prove that the composition of the formed copolymer would reflect the comonomer ratios in the feed. PMMA-co-PegMA containing 18 mol % PegMA was chosen for this experiment. The copolymer synthesis was initiated in diphenyl ether in solution conditions and allowed to proceed to a number average molecular weight of about 5000 Da, corresponding to about 50% conversion. At this point, the solution polymerization mixture was transferred to a four-fold excess of water (by volume) and mechanically stirred at 1000 rpm for 30 minutes and at 500 rpm thereafter yielding an oil in water suspension.

Figure 7:
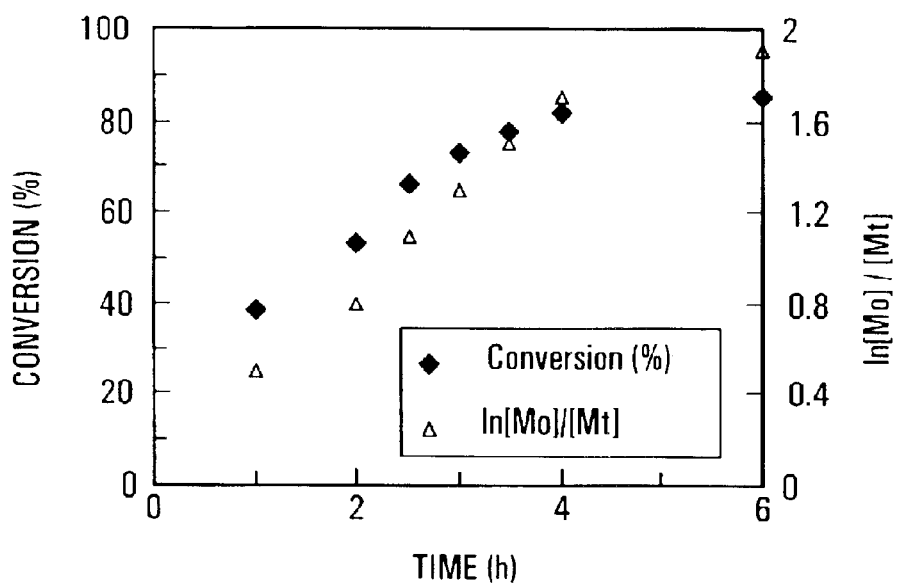
FIG. 7 is a graphic illustration of the kinetics of suspension polymerization of PMMA-co-PegMA. [MMA]$_0$:[PegMA]$_0$:[TSC]$_0$:[Cu(dNBpy)$_2$Br]$_0$=30:7:1:1; 25% total monomer in DPE; suspension=15% monomers+DPE (rel. to water) at 70° C.
Figure 8:
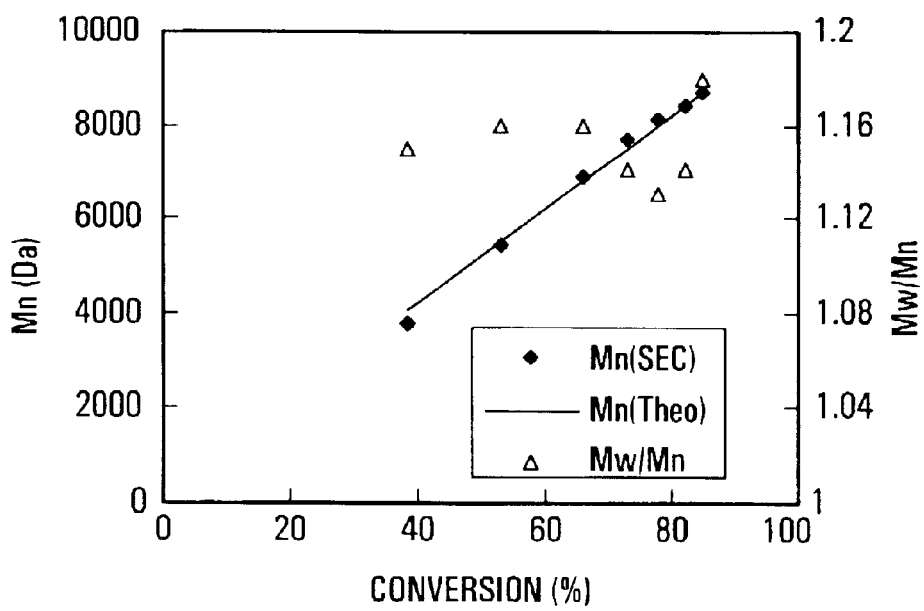
FIG. 8 is a graphic illustration of plots of molecular weight and polydispersity versus conversion for suspension polymerization of PMMA-co-PegMA. [MMA]$_0$:[PegMA]$_0$:[TSC]$_0$:[Cu(dNBpy)$_2$Br]$_0$=30:7:1:1; 25% total monomer in DPE; suspension=15% monomers+DPE (rel. to water) at 70° C.

Results of the suspension reaction for 25% monomer loading are presented in FIGS. 7 and 8. FIG. 7 shows time-conversion curves. The plot of ln $([M_o]/[M_t])$ versus time is non-linear above 80% conversion. This may be attributed to slow diffusion of the water soluble macromonomer back into the oil phase rather than to irreversible termination reactions such as recombination of growing radicals. Slow diffusion would cause the total monomer concentration in the oil phase to be lower than if neither monomer would partition into the aqueous phase. Hence, at high conversion i.e., low (instantaneous) monomer concentration, the propagation kinetics can switch from a reaction control to a diffusion control. A similar observation was made in the solution ATRP of the macromonomer poly(vinyl ether) methacrylate (Yamada, K. et. al., Macromolecules 1999, 32, 290–293) where the increasing viscosity of the polymerization medium limits access of the growing polymer chains to the slow-diffusing macromonomers. FIG. 8 shows that the molecular weight increased linearly with conversion and that polydispersity remained below 1.2, suggesting good living character. Hence, the ATRP synthesis of the amphiphilic copolymer was achieved (with over 80% monomer conversion) in suspension polymerization conditions.

Figure 9:
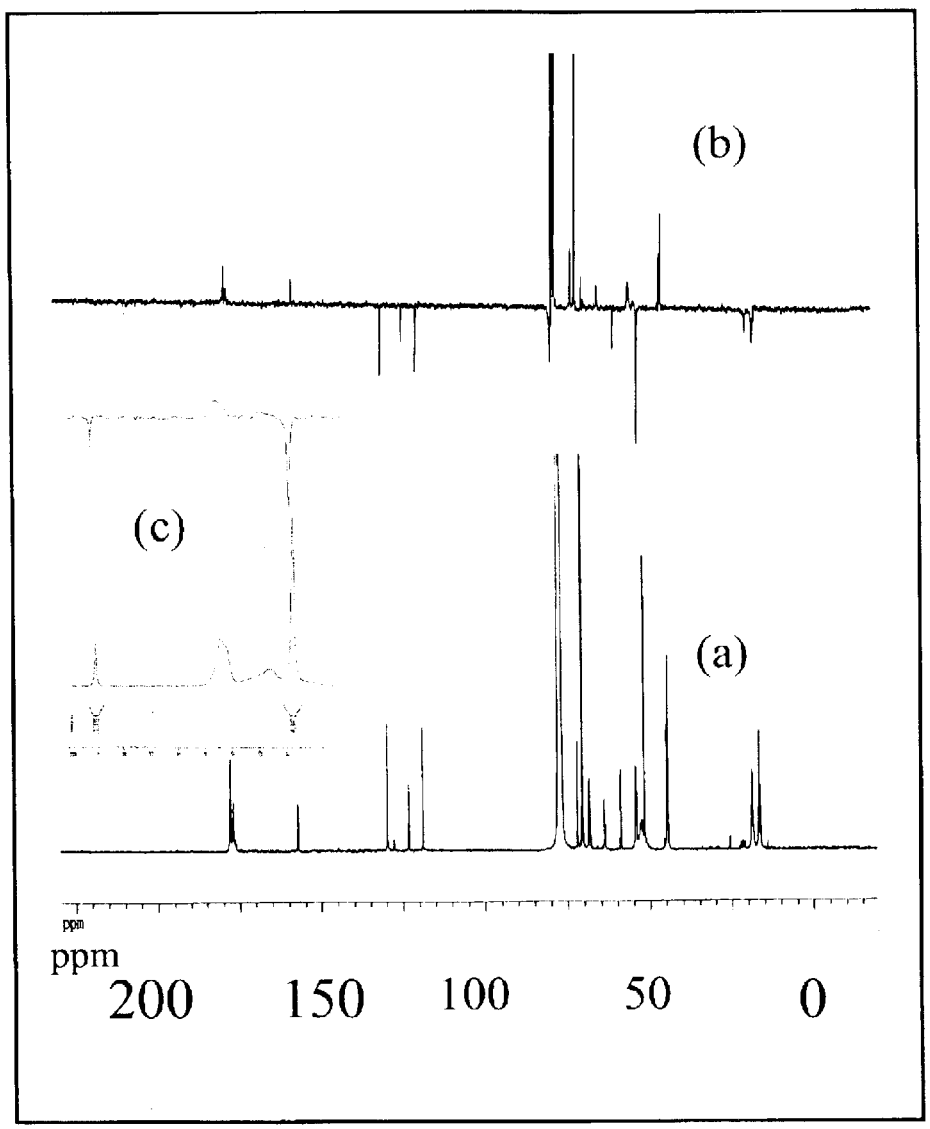
FIGS. 9(a), 9(b) and 9(c) are carbon-13 NMR of Poly(MMA-co-PegMA) in CDCl$_3$, J-modulated spin sort spectrum of Poly(MMA-co-PegMA), and Expansion ($\delta_c$=50–60 ppm) of FIGS. 9(a) and 9(b) spectra, respectively.
Figure 10:
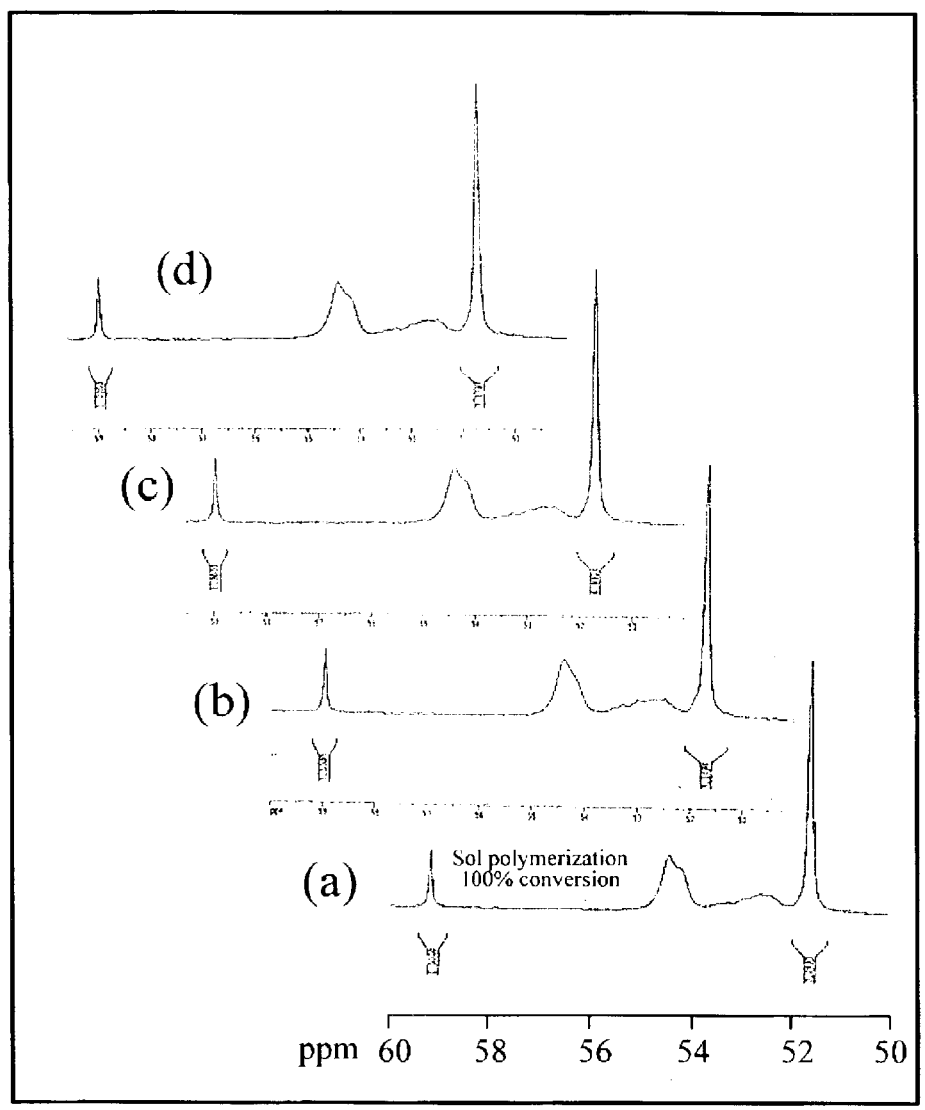
FIGS. 10(a), 10(b), 10(c) and 10(d) are carbon-13 spectra ($\delta_c$=50–60 ppm) of Poly(MMA-co-PegMA) in CDCl$_3$ prepared by solution polymerization at 100% conversion, solution polymerization at ~50% conversion, 1 hour in suspension polymerization at 73% conversion, and 2 hour in suspension polymerization at 82% conversion, respectively.
Figure 11:
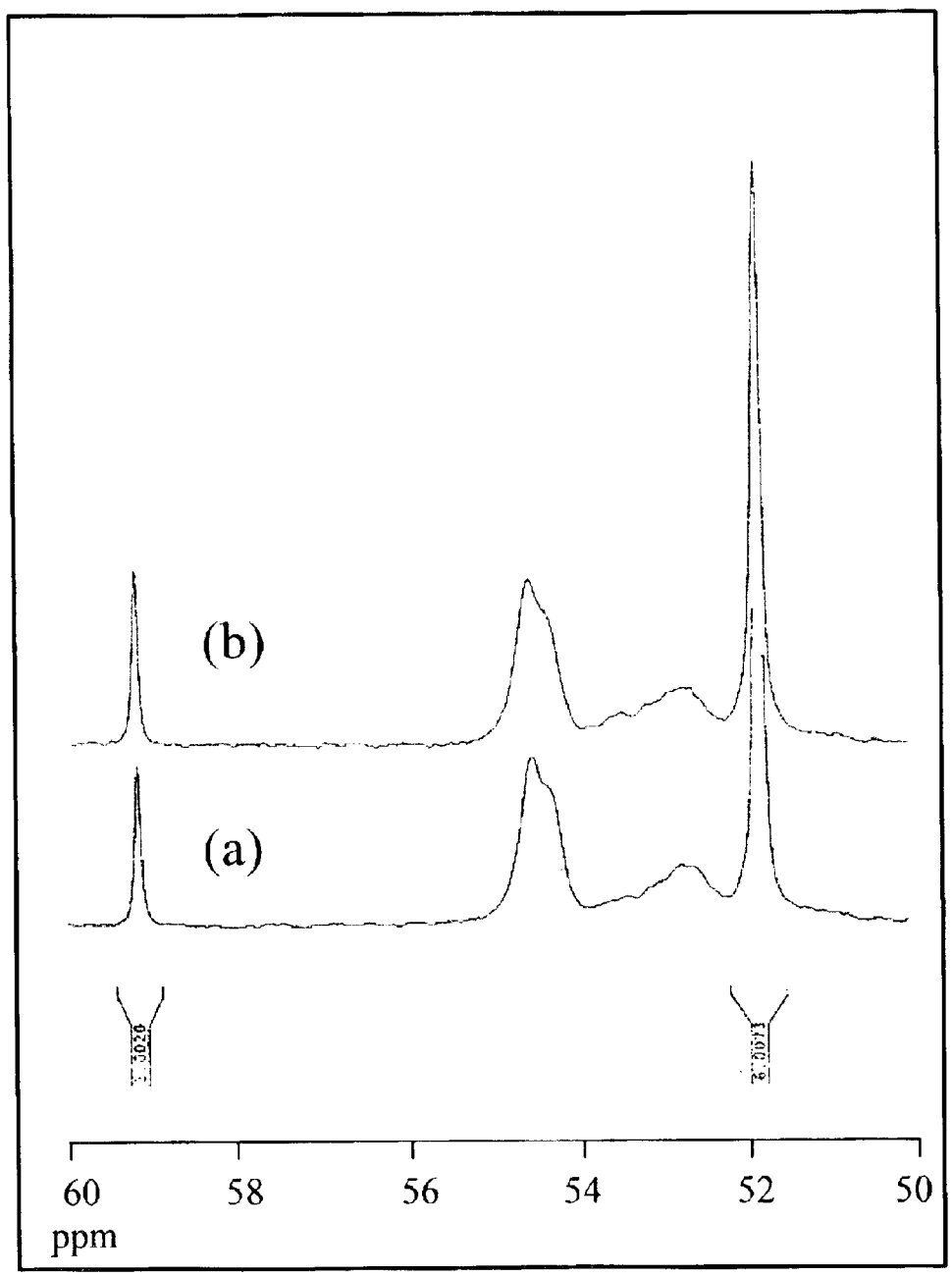
FIGS. 11(a) and 11(b) are carbon-13 spectra ($\delta_c$=50–60 ppm) of Poly(MMA-co-PegMA) in CDCl$_3$ with Cr(acac)$_3$ prepared by solution polymerization at 100% conversion and 2 hour in suspension polymerization at 82% conversion, respectively.
Figure 12:
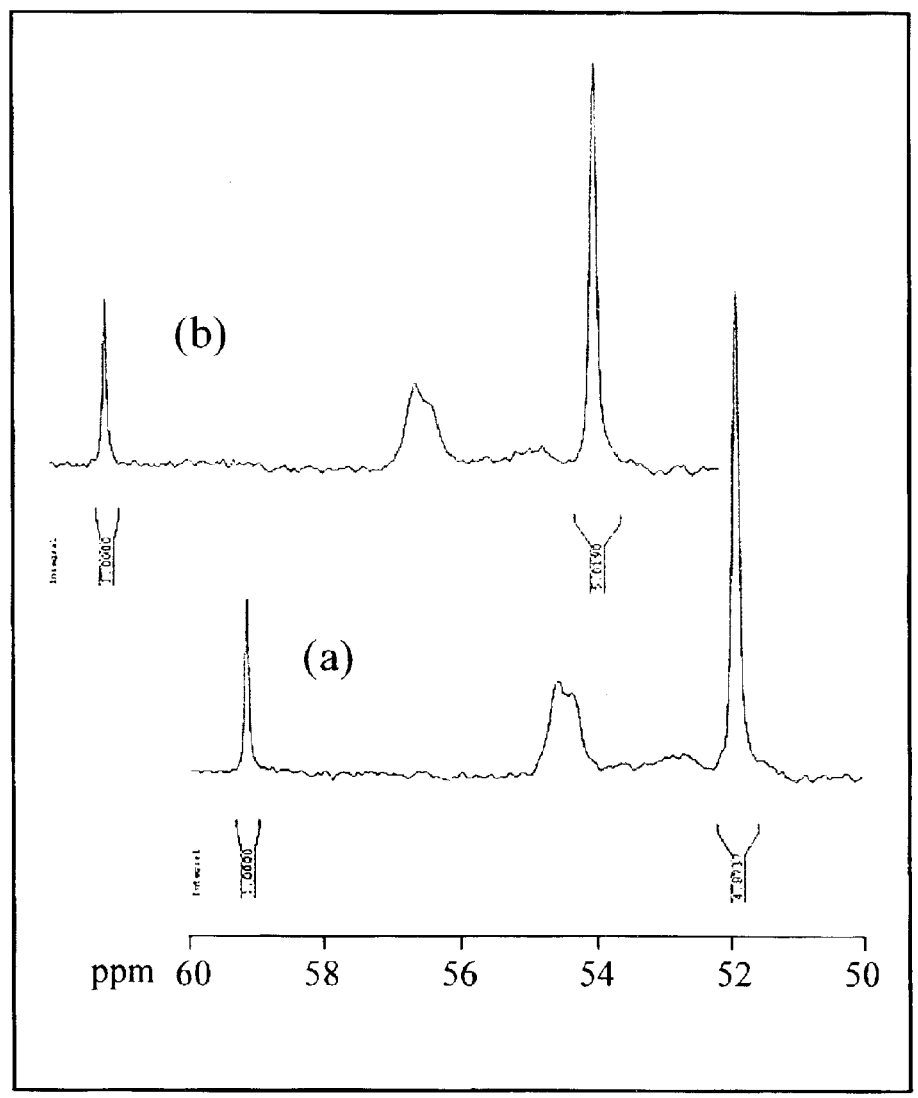
FIGS. 12(a) and 12(b) are carbon-13 spectra ($\delta_c$=50–60 ppm) of Poly(MMA-co-PegMA) in CDCl$_3$ with Cr(acac)$_3$ in a gated decoupling experiment prepared by solution polymerization at 100% conversion and 2 hour in suspension polymerization at 82% conversion, respectively.

In order to confirm that the water soluble comonomer, PegMA, is incorporated in the growing polymer chains in the oil phase during the course of the suspension polymerization, NMR spectra of samples taken prior to, during and the at the end of the suspension polymerization were recorded. 1H NMR did not permit determination of the comonomer ratio in the copolymer due to overlap of potentially useful peaks in the spectrum. FIG. 9 shows the carbon-13 spectrum and the J-modulated spin sort spectrum. The spin sort experiment helps to pin point the methoxy carbon resonances in the copolymer. Methoxy of MMA comonomer was assigned to $\delta_c$=51.9 ppm, while that of the PegMA comonomer was assigned to $\delta_c$=59.2 ppm based on the expected chemical shift values. FIG. 10 shows the spectrum of a sample drawn just prior to transferring the organic reaction mixture to the aqueous phase and those of samples drawn 1 and 2 hours into the suspension polymerization. Also shown is the spectrum of a sample of the copolymer prepared by solution polymerization (conversion=100%). Integration of the relevant peaks yielded 12% PegMA content in all of the spectra. The monomer feed in both the solution and suspension polymerizations contained 18.8% PegMA. Since the solution polymerization had proceeded to quantitative conversion it is reasonable to assume that NMR has underestimated the PegMA content in the samples. Since sensitivity of the methoxy carbons may vary due to differences in the spin lattice relaxation times, the experiments were repeated in the presence of a paramagnetic relaxation agent, cr(acac)$_3$. The spectra from this experiment (FIG. 11) yield a PegMA content of 14% in both the solution polymerization and suspension polymerization samples. Since, the spectra with cr(acac)$_3$ also showed a PegMA content lower than anticipated, a gated decoupling experiment was run to reduce possible enhancement of the MMA methoxy carbon due to Nuclear Overhauser Effect. The spectra in FIG. 12 yield a PegMA content of 17% for both the solution polymerization and suspension polymerization samples. This confirms that PegMA was indeed incorporated into the copolymer to the same extent in the suspension polymerization as it was in the solution polymerization.

The aqueous suspension, when viewed under an optical microscope, showed colloidally stable oil droplets with no tendency to coagulate. Since no surfactant or stabilizer was used in this suspension polymerization, this suggests that the amphiphilic copolymer resides at the oil-water interface thereby stabilizing it.

Encapsulation of Diphenyl Ether.

The encapsulation process consisted of three steps: (1) synthesis of low molecular weight amphiphilic copolymers by solution ATRP; (2) addition of the cross-linking monomer to the reaction solution followed by a 10 minute mixing period to ensure homogeneous distribution of the crosslinking monomer; and (3) transfer of this oil phase to four times excess of 1% aqueous poly(vinyl alcohol) (PVA) in a baffled reactor. The resulting suspension was mechanically stirred with a propeller type mixer at 1000 rpm for 30 minutes and subsequently at 500 rpm to the end of suspension polymerization. The PVA serves as a suspension stabilizer. A series of encapsulation experiments were performed to study the effect of the polymer composition on the internal morphology of the resultant polymer particles. Table 4 gives details of these formulations.

ops with conversion, comparisons are valid only between particles from reactions that have proceeded to a similar conversion.

FIGS. 14–18 show the internal morphology of particles at 80–100% (w/w) conversion for a series of polymer compositions. A clear transition in the internal morphology from matrix particles to hollow core-shell type particles is observable. The TEM images chosen represent the predominant morphology exhibited by the particular particles in question. In all the cases discussed below, a small minority of the particles possesses morphologies other than those shown.

Figure 14A:
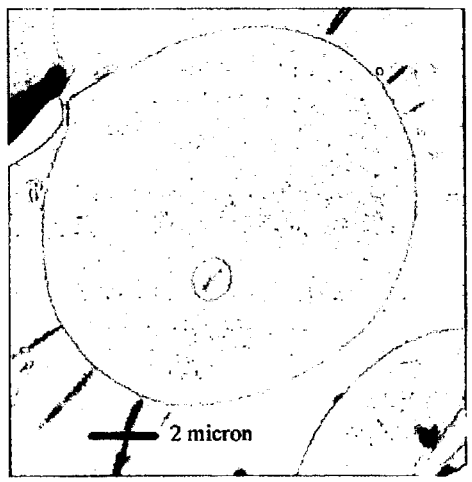
FIG. 14(A) is a TEM micrograph showing internal morphology of PegMA-0 particles at 82% conversion to polymer and FIG. 14(B) is a TEM micrograph showing internal morphology of PegMA-0 particles at 99% conversion to polymer.
Figure 14B:
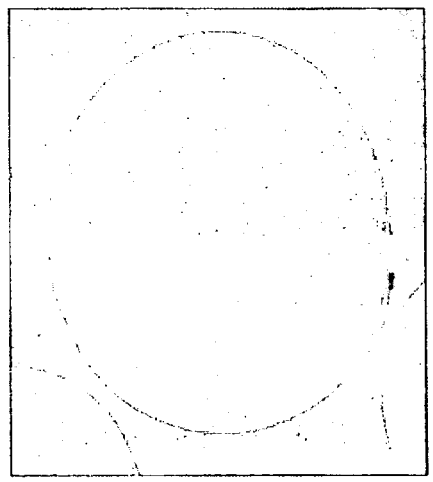

PegMA-0 particles exhibit a matrix morphology with a microporous interior and a denser outer skin at 82% conversion (FIG. 14A). At 99% conversion the density of the interior increases and the microporous structure disappears as the forming polymer occupies the pores (FIG. 14B). This suggests that crosslinked PMMA has a weak tendency to migrate to the oil water interface as it precipitates from DPE.

The PegMA-8 particles at 83% conversion have a macroporous interior and a more distinct dense polymer wall in the interfacial region, at 98% conversion the pores are filled by newly formed polymer (FIGS. 15A, 15B).

Figure 16:
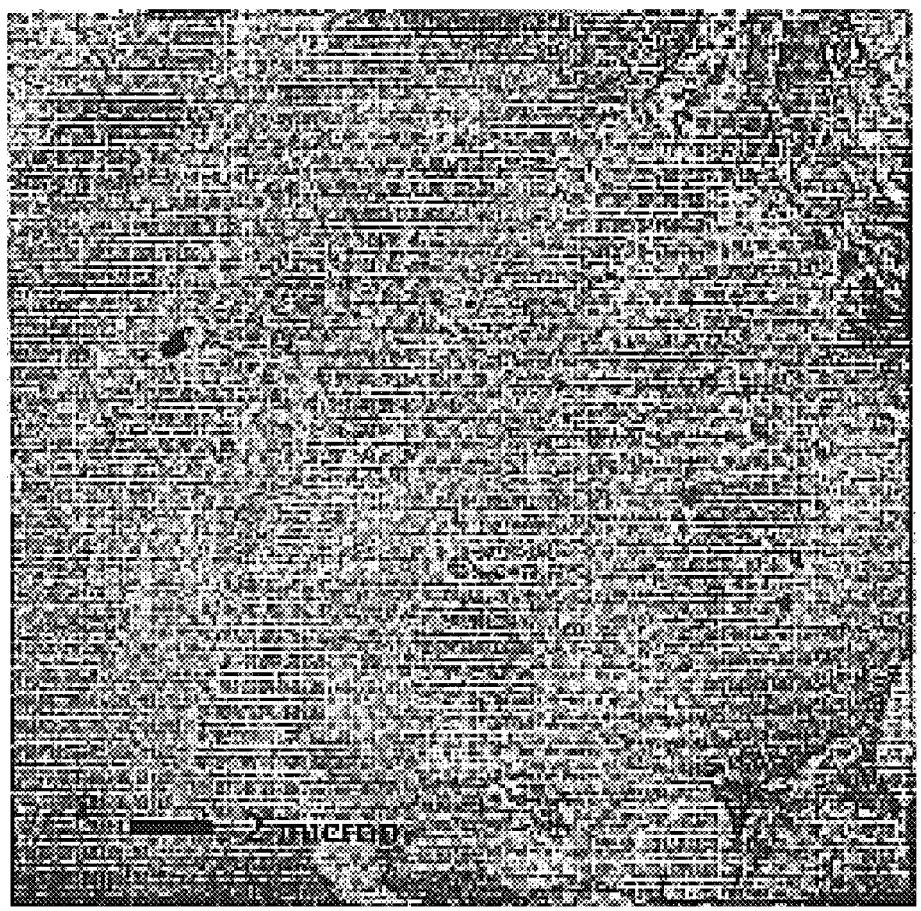
FIG. 16 is a TEM micrograph showing internal morphology of PegMA-15 particles at 98% conversion to polymer.

The PegMA-15 particles exhibit a macroporous interior even at 98% conversion suggesting that the terpolymer has an increasing tendency to migrate to the oil-water interface with increasing fraction of PegMA in the composition (FIG. 16). In this case, the crosslinked terpolymer fills the entire volume of the suspension polymer particles, however, a

TABLE 4

Reaction conditions for encapsulation of diphenyl ether.

Figure 19A:
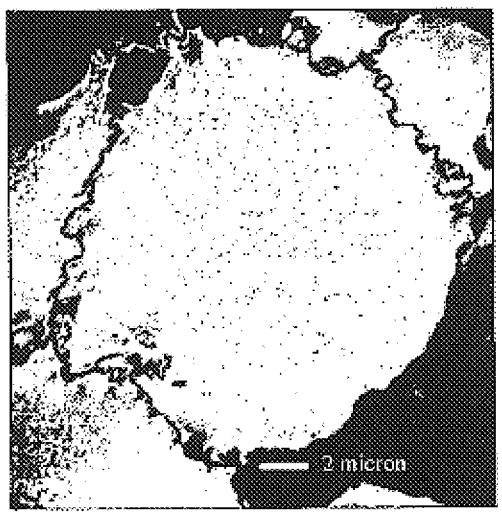
FIG. 19(A) is a TEM micrograph showing internal morphology of PegMA-35-C particles at 79% conversion to polymer and FIG. 19(B) is a TEM micrograph showing internal morphology of PegMA-35-C particles at 97% conversion to polymer. Particles were prepared by conventional free radical polymerization.
Figure 19B:
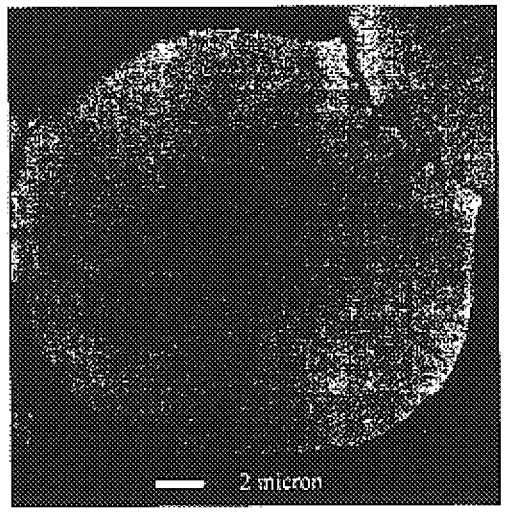

| EXP. #/ Sample Code | Polymer loading in oil phase (% w/w) | Mole % cross-linking monomer (DegDMA) | Mole % water soluble monomer (PegMA) | Conversion at transfer to suspension (% w/w) | Final conversion to polymer (% W/W) | Conversion to polymer of particles (% w/w) | Internal particle morphology (TEM) |
|---|---|---|---|---|---|---|---|
| 1/PegMA-0 | 32 | 20 | 0 | 50 (?) | 100 | 82 | FIG. 14, 15 |
| 2/PegMA-8 | 34 | 20 | 8 | 35 | 98 | 83 | FIG. 16, 17 |
| 3/PegMA-15 | 33 | 20 | 15 | 57 | 100 | 98 | FIG. 18 |
| 4/PegMA-31 | 31 | 20 | 31 | 46 | 99 | 92 | FIG. 17A, 17B |
| 5/PegMA-31 | 30 | 20 | 48 | 30 | 85 | 98 | FIG. 18A, 18B |
| 6*/PegMA-35-C | 28 | 11 | 35 | — | 98 | 79, 97 | FIG. 19A, 19B |

*This encapsulation was done by conventional free radical polymerization.

In entries 1–5 the total polymer loading in the oil phase and the mole % crosslinker were held constant while the mole % water soluble monomer was varied from 0–31 mol %. The total polymer loading in the oil phase was held constant at 30±4% (w/w) so that differences in particle morphology at a given conversion to polymer can be related directly to the interfacial properties of the forming polymer in the oil phase.

Figure 13:
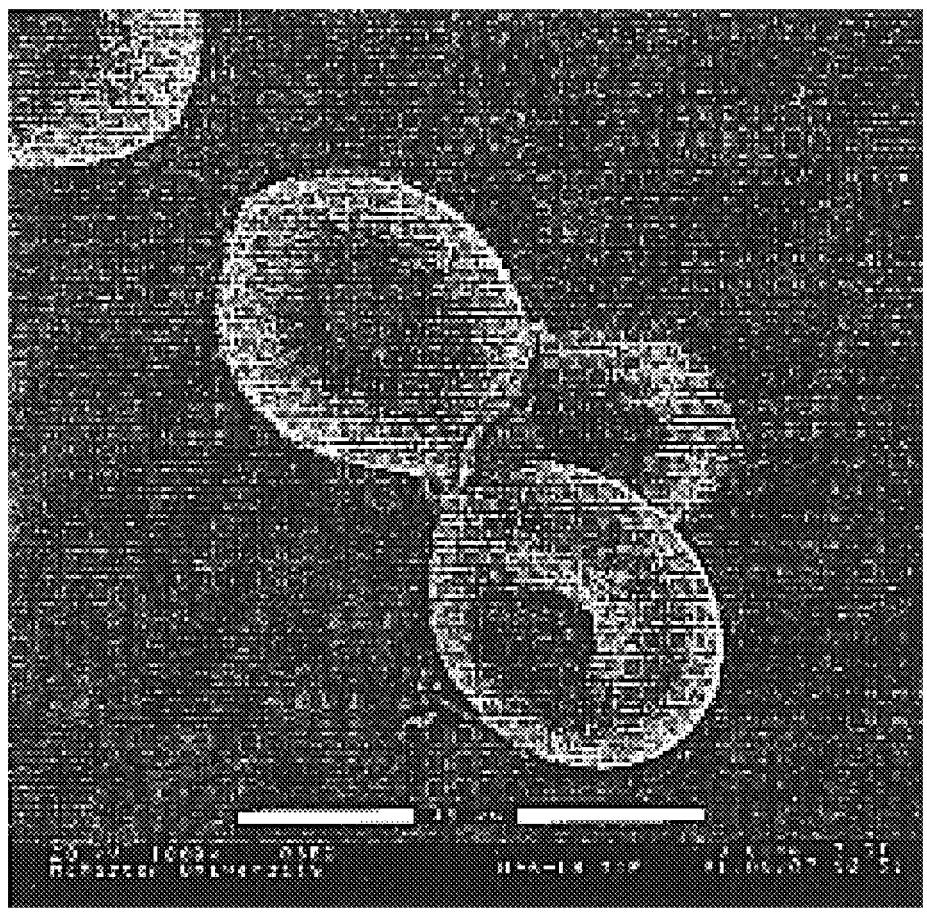
FIG. 13 is an ESEM micrograph showing suspension polymer particles of Poly(MMA-co-PegMA) crosslinked with DegDMA. [MMA]$_0$:[PegMA]$_0$:[DegDMA]$_0$:[TSC]$_0$:[Cu(dNBpy)$_2$Br]$_0$=30:7:9:1:1; 32% total monomer in DPE; suspension 11% monomers+DPE and 1% PVA (rel. to water) at 70° C.

FIGS. 13 shows an Environmental Scanning Electron Micrograph (ESEM) of the suspension polymer particles PegMA-15. The ESEM image showed that while most polymer particles maintained their spherical shape some were deflated and assumed a red blood cell like shape under the high vacuum in an ESEM sample preparation step. This suggests that the polymer particles have a hollow or less dense interior and a dense surface shell. Transmission Electron Microscopy (TEM) was conducted to determine the internal morphology of the particles. Since conversion is relatively slow in ATRP reactions, applicants have observed that the morphology of the particles develops over time during the encapsulation reaction. Since morphology develmacroporous interior characterized by internal voids and a relatively high density surface skin are observable. This morphology suggests that some amphiphilic terpolymer migrates to the oil water interface; the rest remains kinetically and enthalpically trapped in the interior of the particle to form a lower density matrix.

Upon further increasing the PegMA content to 31 mol % (PegMA-31) the particles exhibit a matrix morphology characterized by large internal voids at 92% (w/w) conversion (FIG. 17A). At 98% conversion the particle morphology develops from that of FIG. 19 to particles characterized by a distinct thin walled capsular structure as seen in FIG. 17B. While FIG. 17 shows the predominant morphologies observed for this polymer composition, a significant minority of particles exhibited a range of morphologies represented by FIG. 18. The trend toward hollow capsular particles with increasing PegMA content is easily discernible.

To study the effect of having used a living polymerization, an experiment using conventional free radical polymerization was conducted. A monomer feed containing 35 mol % PegMA, 11 mol % DegDMA and 54 mol % MMA was polymerized under suspension polymerization conditions using benzoyl peroxide as a thermal initiator at 70° C. In this experiment, initiator, monomers and solvent were mixed at room temperature and degassed by a stream of Argon for 30 minutes. This oil phase was then transferred to a four fold excess of 1% aqueous PVA at 70° C. in a reactor. The suspension was mixed at 1000 rpm for 30 minutes and at 500 rpm thereafter. For direct comparison with ATRP particles it would be desirable that these particles be prepared using 20 mol % crosslinker. However, colloidal stability of the suspension particles is lost at 20 mol % DegDMA when particles are prepared by conventional free radical polymerization (CFRP). Thus, in order to obtain particles that did not coagulate, a lower crosslinker concentration was used. It is believed that the difference in colloidal stability suggests that the actual crosslink density of the particles prepared by ATRP is lower than that expected from the fraction of crosslinker in the monomer feed. A plausible explanation would be the low radical concentrations in ATRP polymerizations and the possible resulting inefficiency in crosslinking. FIGS. 19A and 19B show the internal morphology of the CFRP particles at 79 and 97% (w/w) conversion to polymer. The analogous ATRP particles are the PegMA-31 shown in FIGS. 17A and 17B. No transition in morphology is observable in the CFRP particles in going from 79 to 97% conversion. The only observable change with conversion is the expected increase in density of the matrix at higher conversion. Thus, there is a clear difference in morphology between the ATRP particles and the CFRP particles. Applicants attribute this difference to the fact that the forming polymer in the CFRP case is not amphiphilic owing to the partitioning of the water soluble monomer into the aqueous phase which keeps it from being incorporated into the growing polymer. There is therefore no driving force for migration of the polymer to the oil-water interface causing it to precipitate uniformly within the entire volume of the oil droplet.

Based on the results described above, applicants have shown that the use of a living polymerization ensures the continued incorporation of a water soluble comonomer in the synthesis of copolymers comprised of a water soluble and an oil soluble monomer by suspension polymerization. This finding has obvious implications for the synthesis of amphiphilic random copolymers as well as block copolymers that serve as non-ionic surfactants. Applicants have applied this concept to the synthesis of crosslinked particles, where the ability to synthesize amphiphilic copolymer or terpolymers translates into control over particle morphology. Interesting differences between the rate and efficiency of crosslinking reactions by ATRP as compared to crosslinking by CFRP have also been observed.

As reflected by its solubility parameter, diphenyl ether is a relative polar solvent and encapsulation of solvents with such high polarity has not been reported thus far by the suspension polymerization technique. Accordingly, it is believed that the ability to synthesize sufficiently polar polymers in the oil phase is the key to successfully preparing capsular particles.

The following example is provided to describe representative materials and methods of the invention. The example is provided for the purpose of illustration of the inventive concepts and is not intended to limit the scope of the invention as defined by the appended claims.

EXAMPLE

Materials.

Copper (I) bromide, toluene sulfonyl chloride, 4,4'-dinonyl-2,2'-dipyridyl, diphenyl ether and poly(vinyl alcohol) (80% hydrolyzed, $M_n$=9000–10,000 Da) were purchased from Aldrich and used as received. Methyl methacrylate, poly(ethylene glycol monomethyl ether) methacrylate ($M_n$~300 Da) and diethylene glycol dimethacrylate were obtained from Aldrich and passed over a basic alumina column to remove inhibitor.

Solution ATRP in Diphenyl Ether.

CuBr, dNBpy, MMA, PegMA, and DPE were placed in a round bottomed flask in a nitrogen filled glove bag and closed with a septum. TSC was dissolved in a portion of MMA in a separate round bottomed flask inside the glove bag and closed with a glass stopper. The monomer and catalyst solution was degassed in a stream of argon for 30 minutes and then transferred to an oil bath at 70° C. The initiator solution was introduced drop wise over a 10 minute period via a previously degassed syringe to the monomer and catalyst solution. Samples were drawn periodically via a previously degassed syringe for Gel Permeation Chromatography (GPC) and conversion measurements. GPC samples were prepared by diluting with THF and passing over a neutral alumina column to remove catalyst. Conversion was determined gravimetrically by precipitation of samples in cold (−15° C.) pentane and weighing the polymer precipitate.

Suspension ATRP.

The solution polymerization mixture was transferred via canula to a 100 mL glass reactor containing the desired amount of distilled, deionised water (1% PVA, in case of crosslinking reactions) that had been previously degassed in a stream of argon for 1 hour. The reactor was equipped with appropriate baffles to break the vortex caused by mixing. The suspension was stirred mechanically at 1000 rpm for 30 minutes and at 500 rpm subsequently until the end of suspension polymerization using a propeller type mixer. Aqueous suspension samples for conversion measurement and GPC analysis were drawn periodically via syringe and freeze dried to remove water. The samples, now containing solvent and unreacted monomer, were then dissolved in THF by rolling the vial gently in a modified hot dog roller at room temperature for 24–48 h. The THF solutions were precipitated in pentane, centrifuged, decanted and vacuum dried at 70° C. to constant weight.

Measurements.

Suspension polymerizations were done in a Buchi Miniclave Drive 100 mL glass reactor. Polymer molecular weight was determined using a Waters 590 programmable pump connected to Ultrastryragel columns and a Waters 410 differential refractometer as detector, tetrahydrofuran as elution solvent (flow rate=1 mL/min), and narrow disperse polystyrene standards. The surface and internal morphologies were determined using Phillips-2020 Environmental Scanning Electron Microscope (ESEM) and a JEOL 1200EX Transmission Electron Microscope (TEM), respectively. ESEM samples were prepared by depositing dilute aqueous dispersions of polymer particles on aluminum stubs, drying at room temperature and sputter coating with a 5 nm layer of gold. For TEM analysis, polymer particles were embedded in Spur epoxy resin and microtomed to ~100 nm thickness. Optical microscopy was performed using an Olympus BH-2 microscope, equipped with a Kodak DC 120 Digital Camera. The NMR spectra were recorded using a 300 MHz Bruker AV-300 Machine.

What is claimed is:

1. A process for encapsulating a polar organic solvent which comprises subjecting one or more $C_{1-12}$ alkyl acrylates or $C_{1-12}$ alkyl methacrylates to controlled/living polymerization in the presence of the polar solvent.

2. A process according to claim 1 wherein there is also present in the polymerization one or more comonomers selected from the group consisting of poly(ethylene glycol) methacrylates, poly(propylene glycol)methacrylates, poly(ethylene glycol)acrylates and poly(propylene glycol) acrylates, wherein each poly(ethylene glycol) or poly(propylene glycol) has from 1 to 6 ethylene oxide or propylene oxide repeating units, respectively.

3. A process according to claim 2 wherein the molar ratio of alkyl acrylate or methacrylate to comonomer is in the range from 95:5 to 5:95.

4. A process according to claim 3 wherein the molar ratio of alkyl acrylate or methacrylate to comonomer is in the range from 75:25 to 25:75.

5. A process according to claim 1, wherein a di- or tri-olefin crosslinking agent is also present in the polymerization.

6. A process according to claim 5 wherein the crosslinking agent is a poly(ethylene glycol) dimethacrylate, a poly(propylene glycol)dimethacrylate, poly(ethylene glycol) diacrylate or poly(propylene glycol)diacrylate, wherein each poly(ethylene glycol) or poly(propylene glycol) has from 1 to 6 ethylene oxide or propylene oxide repeating units, respectively.

7. A process according to claim 6 wherein the crosslinking agent is diethylene glycol dimethacrylate.

8. A process according to claim 1 wherein the controlled/living polymerization is carried out by atom transfer radical polymerization (ATRP).

9. A process according to claim 1 wherein the controlled/living polymerization is carried out by stable free radical living polymerization (SFRP).

10. A process according to claim 1 wherein the controlled/living polymerization is carried out by reversible addition-fragmentation chain transfer (RAFT) polymerization.

11. A process according to claim 1 wherein the polar solvent has a solubility parameter in the range from 17 to 23 $Mpa^{1/2}$.

12. A process according to claim 1 wherein the polar solvent is selected from the group consisting of alkyl acetates, alkyl propionates, alkyl butanoates, alkyl adipates, alkyl benzoates, and alkyl with alkyl chains ranging from C1 through C12, aliphatic alcohols ranging from C4 through C12, dialkyl ketones with the sum of both alkyl groups ranging from C4 through C20, and dialkyl ethers with the sum of both alkyl groups ranging from 4 through 20.

13. A process for encapsulating a polar organic solvent comprising:
synthesis of an amphiphilic co-polymer by controlled/living polymerization in a polar solvent;
carrying out the synthesis until a predetermined degree of conversion or length of the co-polymer chain is obtained;
addition of a crosslinking monomer to form a reaction mixture; and
subjecting the reaction mixture to mixing to yield microcapsules containing the polar solvent.

14. The process of claim 13, wherein the amphiphilic co-polymer is comprised of a hydrophilic monomer, a hydrophobic monomer and a crosslinking monomer.

15. A microcapsule comprising a polar solvent encapsulated by an amphiphilic co-polymer shell.

16. The microcapsule of claim 15, wherein the amphiphilic co-polymer is poly(methyl methacrylate-co-poly(ethylene glycol)methacrylate).

17. The microcapsule of claim 15, wherein the polar solvent is diethylene glycol dimethacrylate.

* * * * *